US007672466B2

(12) United States Patent
Yamada et al.

(10) Patent No.: US 7,672,466 B2
(45) Date of Patent: Mar. 2, 2010

(54) AUDIO SIGNAL PROCESSING APPARATUS AND METHOD FOR THE SAME

(75) Inventors: Yuji Yamada, Tokyo (JP); Koyuru Okimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1199 days.

(21) Appl. No.: 11/228,331

(22) Filed: Sep. 19, 2005

(65) Prior Publication Data

US 2006/0067541 A1 Mar. 30, 2006

(30) Foreign Application Priority Data

Sep. 28, 2004 (JP) ............................. 2004-280820

(51) Int. Cl.
*H04B 15/00* (2006.01)

(52) U.S. Cl. .................... 381/94.7; 381/94.1; 381/94.2; 381/94.3; 84/616; 84/654; 379/406.01; 379/406.12

(58) Field of Classification Search ............. 381/17-18, 381/66, 94.1-94.3, 94.7, 98, 1, 61, 27, 110; 84/616, 654, 681; 379/406.01, 406.12-406.14
See application file for complete search history.

(56) References Cited

U.S. PATENT DOCUMENTS 5,862,231 A * 1/1999 Tokuhisa ..................... 381/61
6,405,163 B1 * 6/2002 Laroche ....................... 704/205
7,174,291 B2 * 2/2007 McArthur et al. ........... 704/224
2008/0170711 A1 * 7/2008 Breebaart et al. ............. 381/77

FOREIGN PATENT DOCUMENTS

| | | |
|---|---|---|
| JP | 3-297300 | 12/1991 |
| JP | 4-271700 | 9/1992 |
| JP | 4-296200 | 10/1992 |
| JP | 6-186990 | 7/1994 |
| JP | 6-205500 | 7/1994 |
| JP | 7-39000 | 2/1995 |
| JP | 2002-78100 | 3/2002 |
| JP | 2002-247699 | 8/2002 |
| JP | 2003-274492 | 9/2003 |
| JP | 2004-343590 | 12/2004 |

OTHER PUBLICATIONS

U.S. Appl. No. 11/212,734, filed Aug. 29, 2005, Yamada et al.

* cited by examiner

*Primary Examiner*—Xu Mei
*Assistant Examiner*—Disler Paul
(74) *Attorney, Agent, or Firm*—Oblon, Spivak, McClelland, Maier & Neustadt, L.L.P

(57) ABSTRACT

An audio signal processing apparatus includes a splitting unit for splitting an audio signal of a first system and another audio signal of a second system into pluralities of frequency band components, a level comparing unit for calculating a level ratio or a level difference between each of the frequency bands of the first system and each of the frequency bands of the second systems, and an output control unit for removing frequency band components whose level ratio or level difference calculated by the level comparing unit is equal and substantially equal to a predetermined value from at least one of the first and second systems.

18 Claims, 17 Drawing Sheets

10

SINGING-VOICE REMOVING APPARATUS

AUDIO SIGNAL PROCESSING APPARATUS AND METHOD FOR THE SAME

CROSS REFERENCES TO RELATED APPLICATIONS

The present invention contains subject matter related to Japanese Patent Application JP 2004-280820 filed in the Japanese Patent Office on Sep. 28, 2004, the entire contents of which are incorporated herein by reference.

BACKGROUND OF THE INVENTION

1. Field of the Invention

The present invention relates to an audio signal processing apparatus and a method for processing audio signals in such a manner that audio signals corresponding to predetermined sound sources are removed from time-sequential audio signals of first and second systems, wherein the time-sequential audio signals are constituted of audio signals from a plurality of sound sources.

2. Description of the Related Art

Phonograph records and compact disks record sound as stereo audio signals of left and right channels. The audio signals of the left and right channels are often generated from a plurality of sound sources. Often, the levels of the stereo audio signals in each channel are differed so that, when the stereo audio signals are played using two speakers, sound images of the sound sources are localized at positions between the speakers.

For example, if signals S1 to S5 from five sound sources 1 to 5, respectively, are recorded as a left-channel audio signal SL and right-channel audio signal SR, the signals S1 to S5 may be additively mixed within the audio signal SL and SR at different levels so that the audio signal SL and SR are represented as:

$$SL=S1+0.9S2+0.7S3+0.4S4 \text{ and}$$

$$SR=S5+0.4S2+0.7S3+0.9S4.$$

If the above-described typical stereo audio signals of two channels include a singing voice and instrumental music, by removing the singing voice from the audio signals, the instrumental music having the singing voice removed can be used for a karaoke machine.

FIG. 18 is a block diagram illustrating the structure of such a singing-voice removing apparatus. In stereo music, the singing voice is normally localized in the middle of the other sounds of the left and right channels. Therefore, the singing voice can be removed from the stereo audio output by subtracting the left-channel audio signals from the right-channel or vice versa in the singing-voice removing apparatus illustrated in FIG. 18.

In FIG. 18, the above-described principle is only applied to the audio band for the singing voice. The left-channel audio signal SL and the right-channel audio signal SR are sent to a subtracting circuit 1 and to band-stop filters 2 and 3 for removing frequency band components corresponding to the audio band for the singing voice (for example, 300 Hz to 5 kHz). Then, the result of subtracting the left-channel audio signals from the right-channel or vice versa output from the subtracting circuit 1 is sent to a band-pass filter 4 for separating the frequency band components corresponding to the audio band for the singing voice.

The output signal from the band-stop filter 2 and the output signal from the band-pass filter 4 are added at an adding circuit 5 to obtain a left-channel output signal SOL not including the audio components corresponding to the singing voice. The output signal from the band-stop filter 3 and the output signal from the band-pass filter 4 are added at an adding circuit 6 to obtain a right-channel output signal SOR not including the audio components corresponding to the singing voice.

For further details, refer to Japanese Unexamined Patent Application Publication No. 2000-354299.

SUMMARY OF THE INVENTION

However, when such a method for removing a singing voice is used, the portion of the obtained music, which does not include the singing voice, corresponding to the frequency band of the singing voice will be a monophonic signal, causing the stereo effect to be lost. Moreover, the singing voice is difficult to be completely removed using this method.

The present invention addresses the above-identified and other problems associated with known methods and apparatuses and provides an audio signal processing apparatus and a method for processing audio signals capable of sufficiently removing audio signals of a predetermined sound source, such as the above-described singing voice.

According to an embodiment of the present invention, an audio signal processing apparatus includes a splitting unit configured to split an audio signal of a first system and another audio signal of a second system into pluralities of frequency band components, a level comparing unit configured to calculate a level ratio or a level difference between each of the frequency bands of the first system and each of the frequency bands of the second systems, and an output control unit configured to remove frequency band components whose level ratio or level difference calculated by the level comparing unit is equal and substantially equal to a predetermined value from at least one of the first and second systems.

According to an embodiment of the present invention, the fact that audio signals of two systems are combined at a predetermined level ratio or a level difference is employed. According to an embodiment, the audio signals of the two systems are sectioned into a plurality of frequency bands. The level ratio or the level difference of the frequency bands of the audio signals of the two systems is calculated. Then, signal components of the frequency bands that have a level ratio or a level difference that equals a predetermined value and almost equals the predetermined value are removed from at least one of the audio signals of the two systems.

If the predetermined value of the level ratio or the level difference is for a level ratio or a level difference for audio signals of a predetermined sound source mixed in the audio signals of the two systems, the frequency components constituting the audio signals of the predetermined sound source are removed from at least one of the audio signals of at least two systems. In other words, the audio signals of a predetermined sound source are removed.

According to another embodiment of the present invention, an audio signal processing apparatus includes a first conversion unit configured to convert time-sequential audio signals from a first system into frequency domain signals, a second conversion unit configured to convert time-sequential audio signals from a second system into frequency domain signals, a level calculating unit configured to calculate a level ratio or a level difference between frequency spectral components from the first conversion unit and the frequency spectral components from the second conversion unit wherein the frequency spectral components from the first conversion unit and the frequency spectral components from the second conversion units corresponding to each other, an output control unit configured to control the level of the frequency spectral components obtained from at least one of the first and second conversion units on the basis of the calculation result of the level calculating unit and removing frequency spectral components whose level ratio or level difference calculated by the level comparing unit is equal and substantially equal to a predetermined value from at least one of the frequency spectral components of first and second systems, and an inverse conversion unit configured to convert the frequency domain signals from the output control unit into time-sequential signals.

According to another embodiment, the time-sequential audio signals of the two systems are converted into frequency domain signals by the first and second conversion units and are then converted into a plurality of frequency spectral components.

According to another embodiment, the level ratio or the level difference of corresponding frequency spectral components from the first and the second conversion units is calculated. On the basis to the calculated results, the level of the frequency spectral components obtained from at least one of the first and the second conversion units is controlled so as to removed frequency spectral components having a level ratio or a level difference that equals or almost equals a predetermined value. Then, after the removal, the frequency domain signals are converted into time-sequence signals.

If the predetermined value of the level ratio or the level difference is for a level ratio or a level difference for audio signals of a predetermined sound source mixed in the audio signals of the two systems, the frequency components constituting the audio signals of the predetermined sound source are removed from at least one of the audio signals of at least two systems. In other words, the audio signals of a predetermined sound source are removed.

According to another embodiment, an audio signal processing apparatus according further includes a phase difference calculating unit configured to calculate the phase difference between the frequency spectral components from the first conversion unit and the frequency spectral components from the second conversion unit wherein the frequency spectral components from the first conversion unit and the frequency spectral components from the second conversion unit corresponding to each other, and wherein the output control unit controls the level of the frequency spectral components obtained from at least one of the first and second conversion unit on the basis of the calculation result of the level calculating unit and the phase difference calculated by the phase difference calculating unit and removes the frequency spectral components whose phase difference is equal and substantially equal to a predetermined value from at least one of the first and second conversion unit.

According to another embodiment, time-sequential signals of two systems are converted into frequency domain signals by the first and second conversion units and are further converted into frequency spectral components.

According to another embodiment, the phase difference of corresponding frequency spectral components from the first and the second conversion units is calculated. On the basis of the calculation results, the level of the frequency spectral components obtained from at least one of the first and the second conversion units is controlled so as to remove the frequency spectral components having phase difference equal or almost equal to a predetermined value. Then, after the removal, the frequency domain signals are converted into time-sequence signals.

If the predetermined value of the phase difference is for a phase difference for audio signals of a predetermined sound source mixed in the audio signals of the two systems, the frequency components constituting the audio signals of the predetermined sound source are removed from at least one of the audio signals of at least two systems. In other words, the audio signals of a predetermined sound source are removed.

According to an embodiment of the present invention, audio signals of a sound source mixed with audio signal of two systems having a predetermined level ratio, a predetermined level difference, or a predetermined phase difference are sufficiently removed from the audio signals of at least one of the systems.

DESCRIPTION OF THE PREFERRED EMBODIMENTS

An audio signal processing apparatus and a method for processing audio signals according to embodiments of the present invention will be described with reference to the drawings.

Below, a method of removing sound sources from a stereo audio signal including a left-channel audio signal SL and a right-channel audio signal SR will be described.

For example, if signals S1 to S5 from five sound sources 1 to 5, respectively, are recorded as a left-channel audio signal SL and right-channel audio signal SR, the signals S1 to S5 may be additively mixed within the audio signal SL and SR at different levels so that the audio signal SL and SR are represented as:

$$SL=S1+0.9S2+0.7S3+0.4S4 \quad (1)$$

$$SR=S5+0.4S2+0.7S3+0.9S4 \quad (2)$$

The audio signals S1 to S5 from the sound sources 1 to 5 are distributed among the left-channel audio signal SL and the right-channel audio signal SR with level differences represented by Formulas 1 and 2. Therefore, the original sound sources 1 to 5 can be separated and removed from the left-channel audio signal SL and/or the right-channel audio signal SR if the sound sources 1 to 5 can be distributed among the left-channel audio signal SL and/or the right-channel audio signal SR again on the basis of the distribution ratio represented by Formula 1 and 2.

In general, each sound source includes different spectral components. Based on this fact, in the embodiments described below, the stereo audio signals of the left and right channels are converted into frequency domain signals by a fast Fourier transform (FFT) process with sufficient resolution and are segmented into a plurality of frequency spectral components. Then, the level ratios or the level differences between corresponding frequency spectral components of the audio signals of the left and right channels are determined, and frequency spectral components at a level ratio or with a level difference corresponding to the distribution ratio represented by Formulas 1 and 2 of the audio signals of the sound sources to be separated are detected. In this way, the detected frequency spectral components can be separated. Accordingly, sound sources can be separated without being significantly affected by other sound sources.

Figure 2:
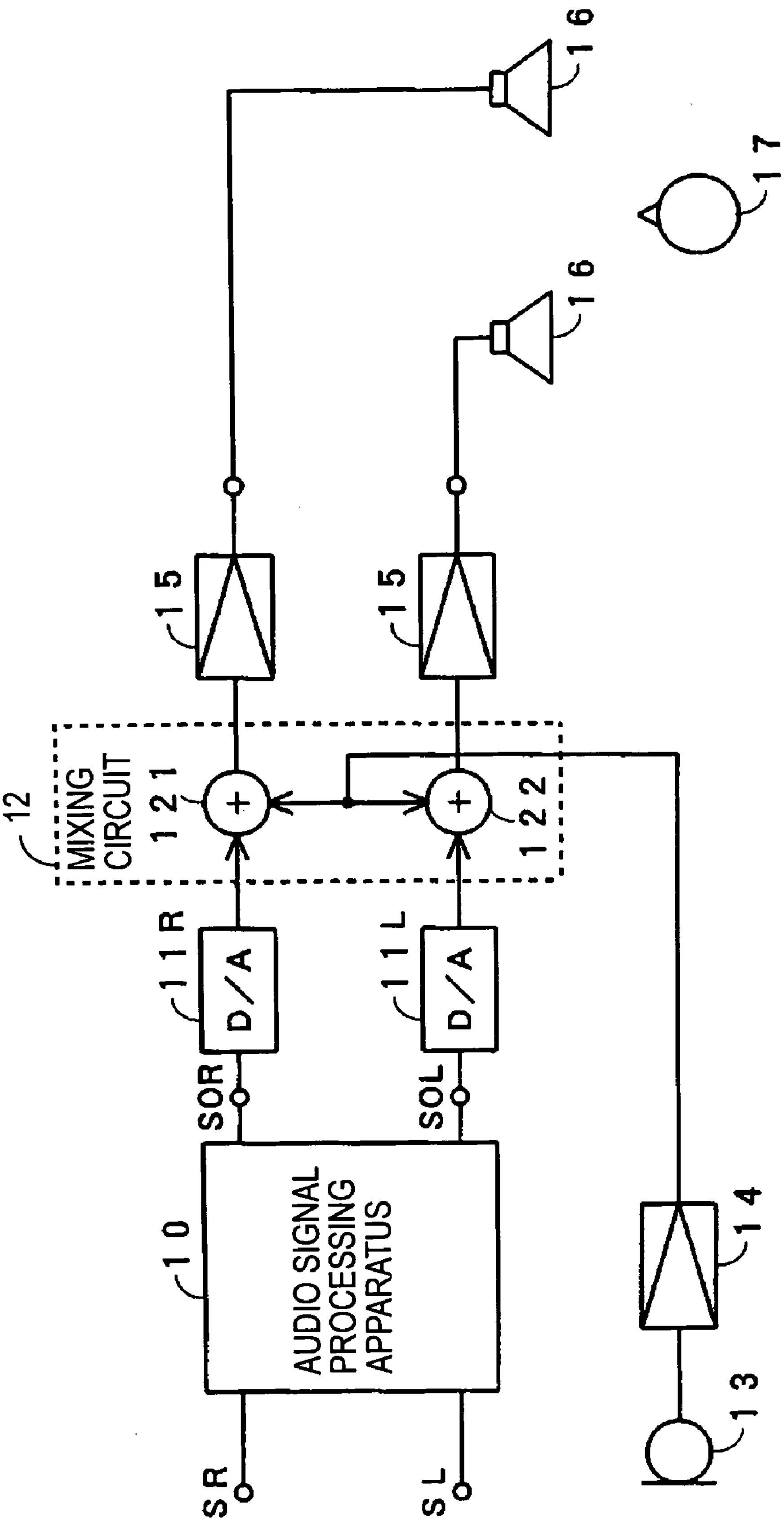
FIG. 2 is a block diagram of a karaoke machine employing the audio signal processing apparatus according to the first embodiment.

FIG. 2 illustrates the structure of a karaoke machine including the audio signal processing apparatus according to the first embodiment of the present invention. In this karaoke machine, first, at the audio signal processing apparatus according to the first embodiment, audio signals of a singing voice in harmony with the instrumental music are removed from the stereo audio signal mixed into the left and right channels at the same levels in both channels. Subsequently, audio signals of the instrumental music not including the signing voice are output from the audio signal processing apparatus according to the first embodiment. The audio signals of the instrumental music are mixed with audio signals of the user's singing voice and are output from loudspeakers.

More specifically, as illustrated in FIG. 2, the left-channel audio signal SL and the right-channel audio signal SR are sent to an audio signal processing apparatus 10 according to the first embodiment, as described below, and the audio signals of the originally recorded singing voice are removed. A left-channel output signal SOL and a right-channel output signal SOR not including the audio signals of the original singing voice is sent from the audio signal processing apparatus 10 to digital/analog (D/A) converters 11L and 11R, respectively. After converted into analog audio signals, the output signals SOL and SOR are sent to adding circuits 121 and 122, respectively, which constitute a mixing circuit 12.

The user's singing voice is picked up through a microphone 13. The audio signals picked up at the microphone 13 are sent to the adding circuits 121 and 122 through an amplifier 14. The audio signals of the user's singing voice are sent to the adding circuits 121 and 122 and are mixed with the audio signal of the instrumental music sent from the D/A converters 11L and 11R.

The mixed output audio signals from the adding circuits 121 and 122 are supplied to a left-channel loudspeaker 16L and a right-channel loudspeaker 16R via the amplifiers 15L and 15R, respectively, and are output as sound. A listener 17 can listen to the output sound.

Figure 1:
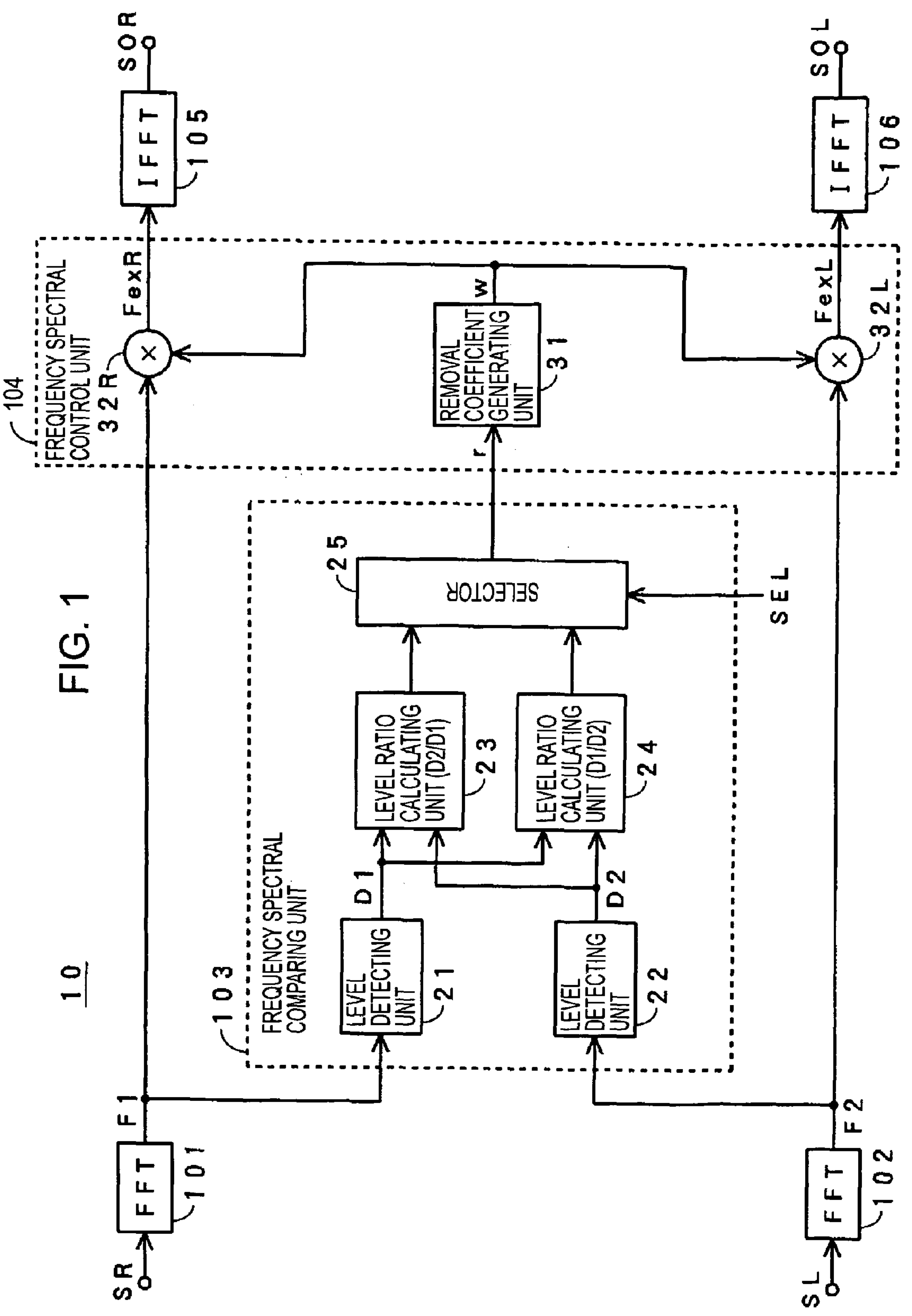
FIG. 1 is a block diagram of an audio signal processing apparatus according to a first embodiment of the present invention.

Structure of Audio Signal Processing Apparatus According to First Embodiment FIG. 1 is a block diagram of the audio signal processing apparatus according to the first embodiment. The right-channel audio signal SR of the two-channel stereo signal is sent to a FFT unit 101, which is a converting unit. If the right-channel audio signal SR is an analog signal, it is converted into a digital signal. Then, fast Fourier transform (FFT) is carried out to convert the time-sequential audio signal into a frequency domain signal. If the right-channel audio signal SR is a digital signal, analog-digital conversion does not have to be carried out on the audio signal SR at the FFT unit 101.

The left-channel audio signal SL of the two-channel stereo signal is sent to a FFT unit 102, which is a converting unit. If the left-channel audio signal SL is an analog signal, it is converted into a digital signal. Then, fast Fourier transform (FFT) is carried out to convert the time-sequential audio signal into a frequency domain signal. If the audio signal SL is a digital signal, analog-digital conversion does not have to be carried out on the audio signal SL at the FFT unit 102.

The FFT units 101 and 102 according to this embodiment have similar structures and are capable of dividing the time-sequential audio signals SR and SL into a plurality of frequency spectral components having different frequencies. Here, the number of frequency spectral components to be generated depends on the ability of the FFT units 101 and 102 for dividing the sound sources. For example, preferably, 500 or more frequency spectral components are generated or more preferably is 4,000 or more frequency spectral components are generated. The number of frequency spectral components is equivalent to the tap number of the FFT unit.

Frequency spectral components F1 and F2 output from the FFT unit 101 and the FFT unit 102, respectively, are sent to a frequency spectral comparing unit 103 and a frequency spectral control unit 104.

The frequency spectral comparing unit 103 calculates the level ratio of the frequency spectral component F1 from the FFT unit 101 and the frequency spectral components F2 from the FFT unit 102 that are the same frequency. The calculated level ratio is sent to the frequency spectral control unit 104.

The frequency spectral control unit 104 receives information on the level ratio from the frequency spectral comparing unit 103 and removes only the frequency spectral components at a predetermined level ratio from the outputs of the FFT units 101 and 102. The frequency spectral control unit 104 sends the resulting outputs FexR and FexL to inverse FFT units 105 and 106, respectively.

The level ratio of the frequency spectral components of the sound sources to be separated by the frequency spectral control unit 104 is set in advance by the user. In this way, the frequency spectral control unit 104 separates only the frequency spectral components of the audio signal of the sound sources that are distributed among the left and right channels at a level ratio set by the user.

The inverse FFT units 105 and 106 reconvert the frequency spectral components of the resulting outputs FexR and FexL from the frequency spectral control unit 104 to a time-sequential signal. The obtained time-sequential signal signals are output as output signals SOR and SOL that do not include the audio signals of the sound sources set to be removed by the user.

Structure of Frequency Spectral Comparing Unit According to First Embodiment

The frequency spectral comparing unit 103 according to this embodiment functionally includes the components included in the area surrounded by the dotted line in FIG. 1. In other words, the frequency spectral comparing unit 103 includes level detecting units 21 and 22, level ratio calculating units 23 and 24, and a selector 25.

The level detecting unit 21 detects the level of the frequency spectral component F1 from the FFT unit 101 and outputs the detection result D1. The level detecting unit 22 detects the level of the frequency spectral component F2 from the FFT unit 102 and outputs the detection result D2. According to this embodiment, to detect the level of a frequency spectral component, the amplitude spectrum is detected. Instead of the amplitude spectrum, the power spectrum may be detected.

The level ratio calculating unit 23 calculates the level ratio D1/D2. The level ratio calculating unit 24 calculates the inversed level ratio D2/D1. The level ratios calculated at the level ratio calculating units 23 and 24 are sent to the selector 25. At the selector 25, one of the level ratios D1/D2 and D2/D1 is output as a level ratio r.

A selection control signal SEL is sent to the selector 25. The selection control signal SEL controls the selector 25 to select one of the outputs from the level ratio calculating units 23 and 24 depending on the audio signals of the sound source to be removed set by the user and the level ratio of the audio signals. The level ratio r output from the selector 25 is sent to the frequency spectral control unit 104.

At the frequency spectral control unit 104 according to this embodiment, the level ratio of the audio signals of the sound source to be removed is typically a value equal to or smaller than one (level ratio≦1). More specifically, the level ratio r sent to the frequency spectral control unit 104 is determined by dividing a smaller level of a frequency spectral component with a larger level of a frequency spectral component.

Therefore, to remove audio signals of a sound source that are distributed more to the right-channel audio signal SR than the left-channel audio signal SL, the frequency spectral control unit 104 uses the level ratio calculated at the level ratio calculating unit 23. In contrast, to remove audio signals of a sound source that are distributed more to the left-channel audio signal SL than the right-channel audio signal SR, the frequency spectral control unit 104 uses the level ratio calculated at the level ratio calculating unit 24.

If distribution ratio values PL and PR (which are values smaller than one) of audio signals of the left and right channels are to be input by the user to set the level ratio of the audio signals of the sound source to be removed, the selection control signal SEL controls the selector 25 to select the output (D2/D1) from the level ratio calculating unit 23 for the level ratio r if the set distribution ratio values PL and PR have a relationship PL/PR≦1, whereas the selection control signal SEL controls the selector 25 to select the output (D1/D2) from the level ratio calculating unit 24 for the level ratio r if the set distribution ratio values PL and PR have a relationship PL/PR>1.

If the distribution ratio values PL and PR input by the user are equal (i.e., level ratio r=1), the selector 25 may select either the output from the level ratio calculating unit 23 or the output from the motor driver 24.

Structure of Frequency Spectral Control Unit According to First Embodiment

The frequency spectral control unit 104 according to this embodiment, as illustrated in FIG. 1, functionally includes the components included in the area surrounded by the dotted line in FIG. 1. In other words, the frequency spectral control unit 104 includes a removal coefficient generating unit 31, which is a multiplication coefficient generating unit, a right-channel multiplying unit 32R, and a left-channel multiplying unit 32L.

The right-channel multiplying unit 32R receives the frequency spectral component F1 from the FFT unit 101 and a removal coefficient (multiplication coefficient) w from the removal coefficient generating unit 31. The result of multiplying the frequency spectral component F1 and the removal coefficient w is output from the frequency spectral control unit 104 as an output FexR of the right-channel spectral components.

The left-channel multiplying unit 32L receives the frequency spectral component F2 from the FFT unit 102 and the removal coefficient w from the removal coefficient generating unit 31. The result of multiplying the frequency spectral component F2 and the removal coefficient w is output from the frequency spectral control unit 104 as an output FexL of left-channel spectral components.

The removal coefficient generating unit 31 receives the level ratio r output from the selector 25 of the frequency spectral comparing unit 103 and generates a removal coefficient w in accordance to the level ratio r. The removal coefficient generating unit 31, for example, includes a function generating circuit for generating a function related to the removal coefficient w wherein the level ratio r is a variable. The function used for the removal coefficient generating unit 31 is selected in accordance with the distribution ratio values PL and PR input by the user corresponding to the sound source to be removed.

Since the level ratio r sent to the removal coefficient generating unit 31 changes for each frequency spectral component, the removal coefficient w generated at the removal coefficient generating unit 31 also changes for each frequency spectral component.

Accordingly, at the right-channel multiplying unit 32R, the removal coefficient w controls the level of the frequency spectral components from the FFT unit 101, and, at the left-channel multiplying unit 32L, the removal coefficient w controls the level of the frequency spectral components from the FFT unit 102.

Figure 3A:
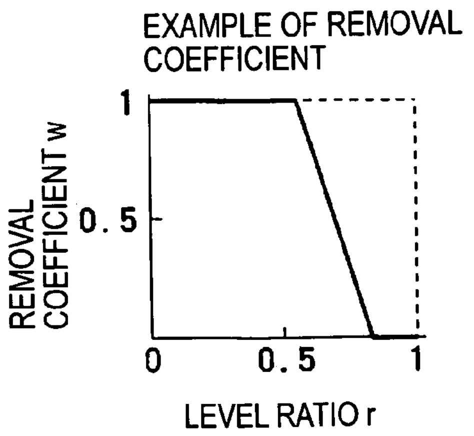
FIGS. 3A to 3D illustrate examples of functions set for removal coefficient generating units of a frequency spectral control unit illustrated in FIG. 1.
Figure 3B:
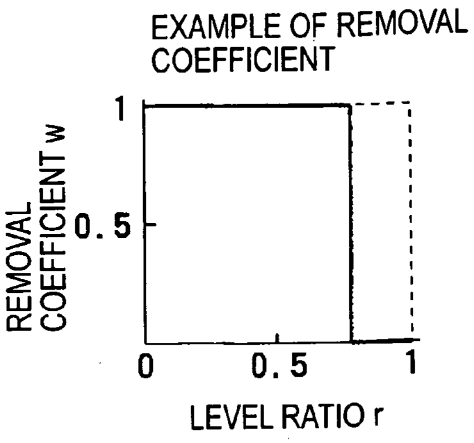

FIGS. 3A to 3D illustrate examples of functions used for the function generating circuits of the removal coefficient generating unit 31. According to this embodiment, the audio signals S3 of a singing voice whose sound image is localized in the center of the sound images of the left and right channels are removed from the left-channel audio signal SL and the right-channel audio signal SR that are represented by Formulas 1 and 2. Therefore, a function generating circuit capable of generating a function having the characteristics shown in FIG. 3A or 3B is used for the removal coefficient generating unit 31.

According to the characteristics of the functions shown in FIGS. 3A and 3B, when the level ratio r of the left and right channels equals or almost equals 1, i.e., when the frequency spectral components of the left and right channels are at the same or almost the same level, the removal coefficient w equals or almost equals 0 and, when the frequency spectral components are at level ratios other than the level ratio r, the removal coefficient equals 1.

According to the characteristics of the function shown in FIG. 3A, the removal coefficient w equals 1 when the level ratio r of the left and right channels is less than 0.6 ($r<0.6$) and the removal coefficient w linearly changes from 1 to 0 when the level ratio r of the left and right channels is more than 0.6 and less than 0.8 ($0.6<r<0.8$). According to the characteristics of the function shown in FIG. 3B, the removal coefficient w equals 1 when the level ratio r of the left and right channels is less than 0.8 ($r<0.8$) and the removal coefficient w equals 0 when the level ratio r of the left and right channels is above than 0.8 ($0.8\leqq r$).

Accordingly, the removal coefficient w is 0 for frequency spectral components corresponding to the level ratio r sent from the selector 25 equals or almost equals 1 or almost 0. Consequently, the frequency spectral components are not output from the multiplying units 32R and 32L.

On the other hand, the removal coefficient w is 1 for frequency spectral components corresponding to the level ratio r sent from the selector 25 is less than 0.6. Consequently, the frequency spectral components are output from the multiplying units 32R and 32L at their original levels.

In other words, the frequency spectral components that are at the same or almost the same level in the left and right channels (i.e., the frequency spectral components of the audio signals of the singing voice) are removed from the plurality of frequency spectral components and are not output from the multiplying units 32R and 32L, whereas the frequency spectral components that are at different levels in the left and right channels are output from the multiplying units 32R and 32L that at their original levels.

As a result, the resulting frequency spectral components do not include the frequency spectral components of the audio signals S3 of the sound source that are distributed at the same level among the left-channel audio signals SL and the right-channel audio signal SR. These resulting frequency spectral components are outputs FexR and FexL from the frequency spectral control unit 104 and are sent from the multiplying unit 32R and 32L, respectively, to the inverse FFT units 105 and 106, respectively.

At the inverse FFT units 105 and 106, the frequency spectral components of the frequency domain signals are converted into digital audio signals and are output as output signals SOR and SOL.

As described above, in the audio signal processing apparatus 10 according to this embodiment, the output signals SOR and SOL not including the audio signal of the singing voice distributed at same levels among the left and right channels are obtained.

In such a case, the audio signal processing apparatus 10 according to this embodiment removes the audio components of the singing voice from the left-channel audio signals SL and the right-channel audio signal SR. Consequently, the stereo effect is not lost as in known audio signal processing apparatuses. Moreover, the sound source to be removed, which in this case is the singing voice, can be removed in a satisfactory manner.

As described above, since the audio signal processing apparatus according to the first embodiment is included in a karaoke machine, the removal coefficient generating unit 31 generates a removal coefficient for removing the audio components of a sound source distributed among the left and right channels at the same level. The function generating circuit for the removal coefficient generating unit 31 may be changed so that the audio components of a sound source distributed at a predetermined level ratio or with a predetermined level difference among the left and right channels can be removed.

Figure 3C:
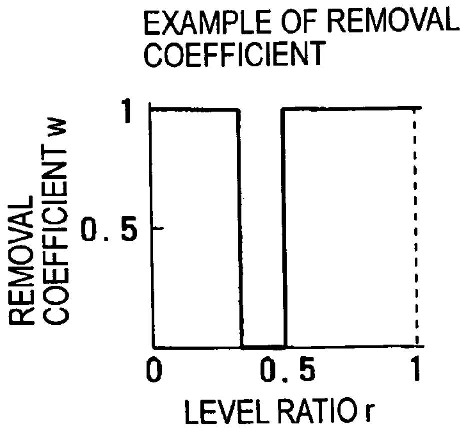

For example, to separate audio signals S2 or S4 distributed among the left and right channels with a predetermined level difference from the left-channel audio signals SL and the right-channel audio signal SR represented by Formulas 1 and 2, a function generating circuit having the characteristics shown in FIG. 3C is used for the removal coefficient generating unit 31.

More specifically, the audio signals S2 are distributed among the left and right channels at a level ratio of D1/D2 (=SR/SL)=0.4/0.9=0.44, and the audio signals S4 are distributed among the left and right channels at a level ratio of D2/D1(=SL/SR)=0.4/0.9=0.44.

According to this embodiment, to separate the audio signals S2, the user sets the left and right distribution ratio for the sound source to be removed as PL:PR=0.9:0.4 or inputs a setting so that PL=0.9 and PR=0.4. If the user sets the distribution ratio as described above, then PR/PL<1. As a result, the selection control signal SEL that controls the selector 25 to select the level ratio from the level ratio calculating unit 24 is sent to the selector 25.

To separate the audio signals S4, the user sets the left and right distribution ratio for the sound source to be separated as PL:PR=0.4:0.9 or inputs a setting so that PL=0.4 and PR=0.9. If the user sets the distribution ratio as described above, then PR/PL>1. As a result, the selection control signal SEL that controls the selector 25 to select the level ratio from the level ratio calculating unit 23 is sent to the level ratio calculating unit 23.

According to a function having the characteristics shown in FIG. 3C, when the level ratio r of the left and right channels equals or almost equals D1/D2 (=PR/PL)=0.4/0.9=0.44, the removal coefficient w equals or almost equals 0 and, when the level ratio r of the left and right channels does not equal 0.44 or almost 0.44, the removal coefficient equals 1.

Accordingly, the removal coefficient w sent from the selector 25 equals or almost equals 0 for the frequency spectral components at a level ratio r of 0.44 or almost 0.44. Consequently, the frequency spectral components are not output from the multiplying units 32R and 32L. On the other hand, the removal coefficient w sent from the selector 25 equals or almost equals 1 for the frequency spectral components at a level ratio r of more or less than 0.44. Consequently, the frequency spectral components are output from the multiplying units 32R and 32L at their original levels.

In other words, the frequency spectral components of the left and right channels that are at a level ratio of 0.44 or almost 0.44 are removed from the plurality of frequency spectral components and are not output from the multiplying units 32R and 32L, frequency spectral components of the left and right channels that are at a level ratio of more or less than 0.44 are output at their original levels.

As a result, the left-channel audio signal SL and the right-channel audio signal SR do not include the frequency spectral components of the audio signals S2 or S4 of a sound source distributed at a level ratio of 0.44.

As described above, according to this embodiment, audio signals of a sound source distributed among left and right channels at a predetermined distribution ratio can be removed from the left and right channels on the basis of the distribution ratio.

In the above-described embodiment, the audio signals to be removed are separated from both channels. However, the audio signals do not necessarily have to be removed from both channels and can be removed from only one channel.

In the above-described embodiment, the audio signals of the sound source are removed from the audio signals distributed among two systems on the basis of the level ratio of the audio signals of the sound source distributed among the two systems. However, the audio signals of the sound source may only be removed from the audio signals of at least one of the two systems on the basis of the level difference of the audio signals of the two systems.

In the above, a two-channel stereo signal of a sound source distributed among left and right channels in accordance with Formulas 1 and 2 was described. However, stereo music signal of a sound source that are intentionally not distributed among left and right channels may be removed in the same way as that illustrated in FIG. 3 by using a removal function in accordance with the level ratio or the level difference of the audio signals of the sound source to be removed.

Figure 3D:
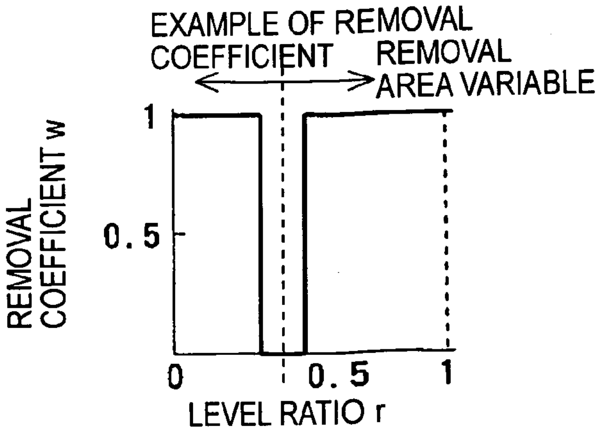

The range of audio signals of a sound source to be removed corresponding to a predetermined range of level ratios may be selected, i.e., may be increased or decreased, for example, by changing the characteristics of the removal function. For example, the removal function having the characteristics shown in FIG. 3D is the same as that shown in FIG. 3C except that the range of audio signals to be removed corresponding to a predetermined range of level ratios is changed.

Many stereo music signals are constituted of sound sources having different spectra. Such stereo music signals may also be removed in the same manner as described above.

For sound sources that have spectra that include regions that overlap each other, the quality of the sound source removal can be improved by improving the frequency resolution of the FFT units 101 and 102, for example, by using FFT circuits of 4,000 taps or more.

Audio Signal Processing Apparatus According to Second Embodiment

In a second embodiment, audio components of a sound source to be removed from frequency spectral components F1 and F2 from FFT units 101 and 102, respectively, are separated. Then, the separated audio components of the sound source are subtracted from the frequency spectral components F1 and F2 from the FFT units 101 and 102, respectively. In this way, audio components of a target sound source can be removed.

Figure 4:
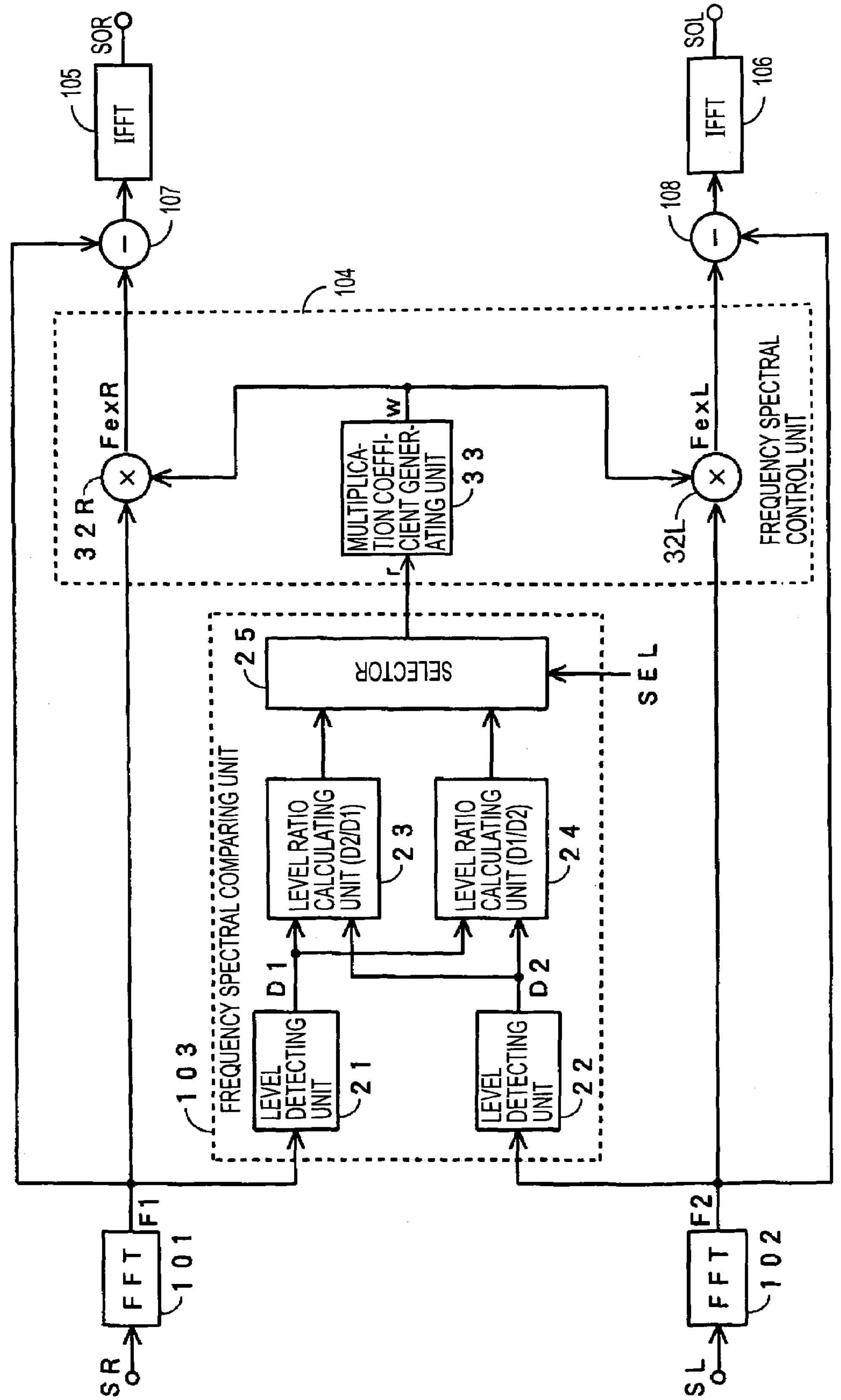
FIG. 4 is a block diagram of an audio signal processing apparatus according to a second embodiment of the present invention.

FIG. 4 is a block diagram illustrating the structure of an audio signal processing apparatus according to the second embodiment. In the second embodiment, a multiplication coefficient generating unit 33 is used instead of the removal coefficient generating unit 31, and subtracting units 107 and 108 are interposed between a multiplying unit 32R and an inverse FFT unit 105 and between a multiplying unit 32L and an inverse FFT unit 106, respectively.

Outputs FexR and FexL from the multiplying units 32R and 32L, respectively, are supplied to the subtracting units 107 and 108, respectively, and a frequency spectral component F1 output from a FFT unit 101 and a frequency spectral component F2 output from a FFT unit 102 are supplied to the subtracting units 107 and 108, respectively. At the subtracting unit 107, the output FexR from the multiplying unit 32R is subtracted from the frequency spectral component F1. Then, the resulting output is sent to the inverse FFT unit 105. At the subtracting unit 108, the output FexL from the multiplying unit 32L is subtracted from the frequency spectral component F2. Then, the resulting output is sent to the inverse FFT unit 106.

A level ratio r is sent from a selector 25 to the multiplication coefficient generating unit 33, and then a multiplication coefficient w is sent from the multiplication coefficient generating unit 33 to the multiplying units 32R and 32L. The multiplication coefficient generating unit 33 generates a multiplication coefficient w, instead of a removal coefficient, for separating the audio components of the sound source to be removed.

Figure 5A:
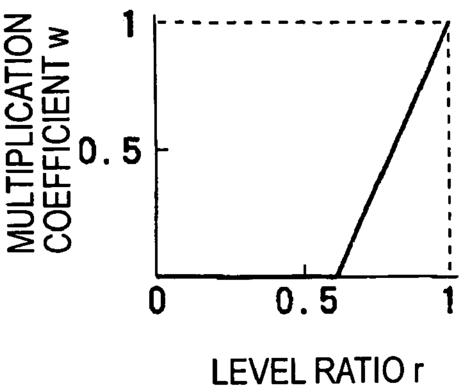
FIGS. 5A to 5D illustrate examples of functions set a for multiplication coefficient generating unit of a frequency spectral control unit illustrated in FIG. 4.
Figure 5B:
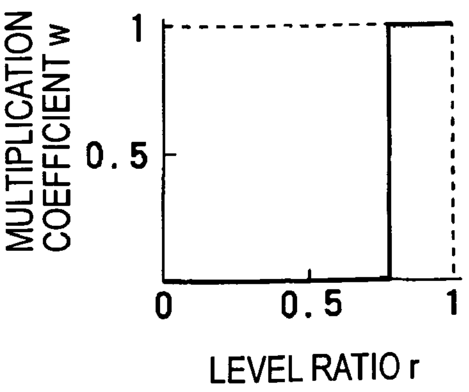
Figure 5C:
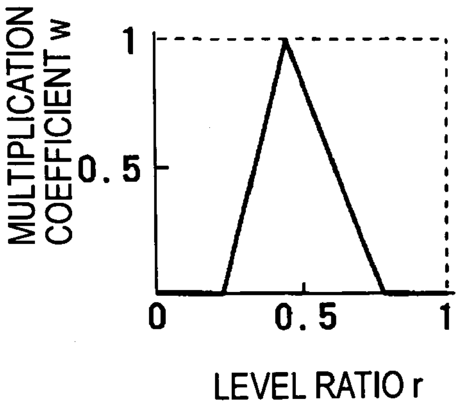
Figure 5D:
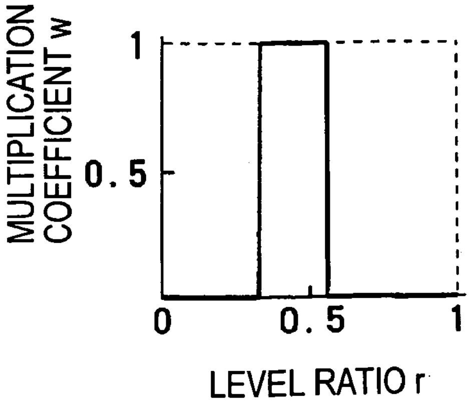

FIGS. 5A to 5D illustrate the characteristics of functions generated by function generating circuits for the multiplication coefficient generating unit 33. For example, if the audio signals to be removed are audio signals S3 of a sound source MS3, a function generating circuit having the characteristics shown in FIG. 5A or 5B is used.

According to the characteristics shown in FIG. 5A or 5B, when the level ratio r of the left and right channels is 1 or almost 1, i.e., for frequency spectral components at the same or almost the same level in the left and right channels, the multiplication coefficient w is 1 or almost 1. When the level ratio r of the left and right channels equals neither 1 nor almost 1, the multiplication coefficient w is 0.

Accordingly, when the multiplication coefficient w is 1 or almost 1 for frequency spectral components at a level ratio r of 1 or almost 1 sent from the selector 25, the frequency spectral components sent from the multiplying units 32L and 32R are output at substantially original levels, whereas, when the multiplication coefficient w is 0 for frequency spectral components at a level ratio r equals neither 1 nor almost 1 sent from the selector 25, the output levels of the frequency spectral components sent from the multiplying units 32L and 32R are reduced to zero and thus the components are not output.

In other words, among the plurality of the frequency spectral components, frequency spectral components that are at the same or almost the same level in the left and right channels are output from the multiplying units 32L and 32R at substantially their original levels, whereas frequency spectral components that have a significant level difference between the left and right channels are not output since their output levels are reduced to zero. As a result, only the frequency spectral components of the audio signals S3 of the sound source MS3 distributed among the left-channel audio signal SL and the right-channel audio signal SR at the same level are obtained at the multiplying units 32R and 32L.

In this way, an output is obtained by subtracting the components of the audio signal S3 of the sound source MS3 from the frequency spectral component F1 at the subtracting unit 107. Then, the obtained output is sent to the inverse FFT unit 105. Another output is obtained by subtracting the components of the audio signal S3 of the sound source MS3 from the frequency spectral component F2 at the subtracting unit 108. Then, the obtained output is sent to the inverse FFT unit 106.

As result, according to the second embodiment, the components of a sound source selected by the user can be removed independently from the right-channel audio signal SR and the left-channel audio signal SL.

Audio Signal Processing Apparatus According to Third Embodiment

An audio signal processing apparatus 10 according to the first embodiment removes audio components of the same sound source from the left-channel audio signal SL and the right-channel audio signal SR. However, audio components of different sound sources may be removed independently from the left-channel audio signal SL and the right-channel audio signal SR. An audio signal processing apparatus 10 according to a third embodiment is capable of removing audio components of different sound sources.

Figure 6:
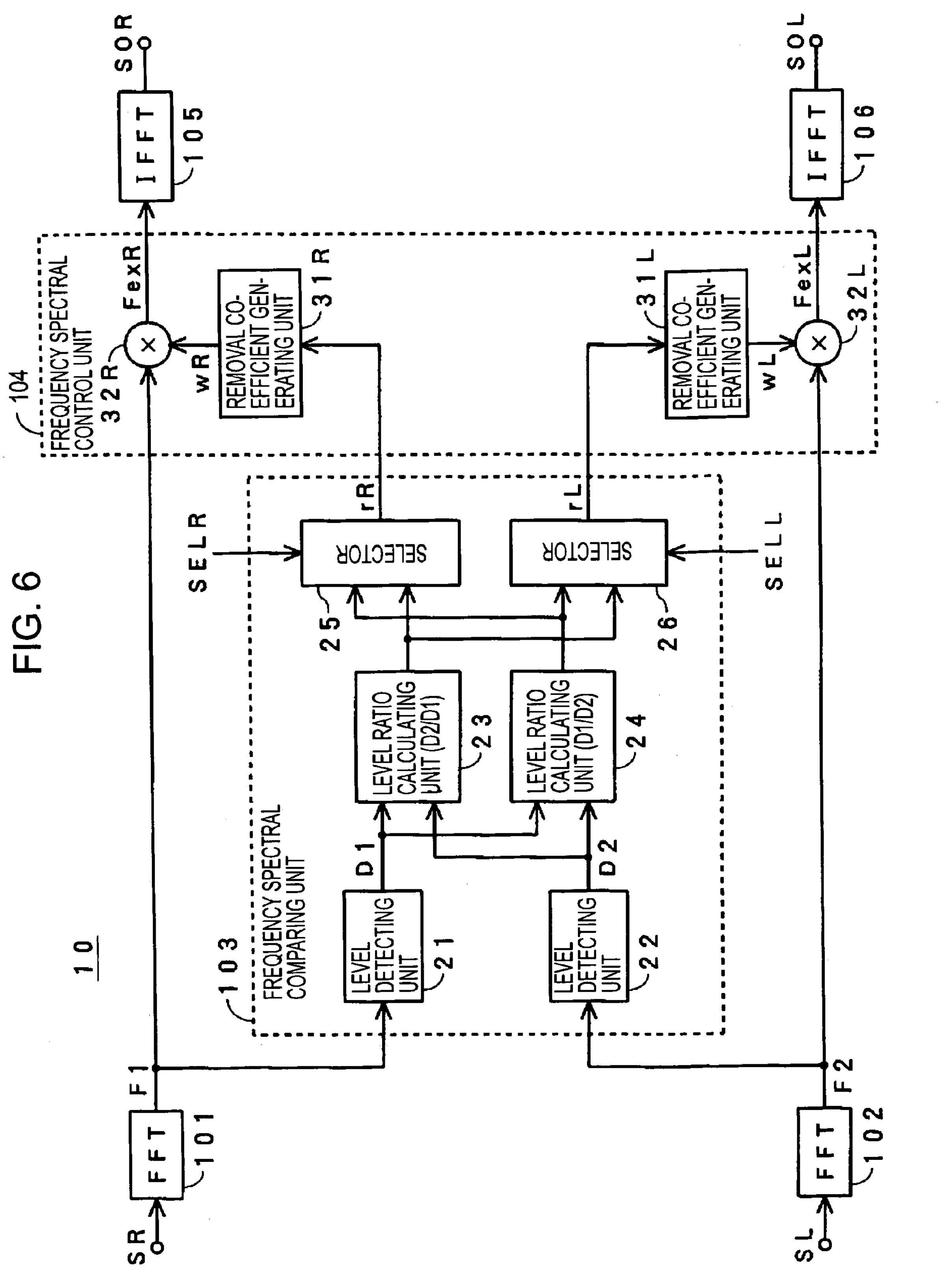
FIG. 6 is a block diagram of an audio signal processing apparatus according to a third embodiment of the present invention.

FIG. 6 is a block diagram of the structure of the audio signal processing apparatus 10 according to the third embodiment. In FIG. 6, for components that are the same as those according to the first embodiment illustrated in FIG. 1 are represented by the same reference numerals.

Structure of Frequency Spectral Comparing Unit According to Third Embodiment

A frequency spectral comparing unit 103 according to the third embodiment includes level detecting units 21 and 22, level ratio calculating units 23 and 24, and selectors 25 and 26. According to the third embodiment, the selector 25 outputs a level ratio rR corresponding to the audio signals of a sound source to be removed from the right channel, and the selector 26 outputs a level ratio rL corresponding to the audio signals of a sound source to be removed from the left channel.

More specifically, the level ratios calculated at the level ratio calculating units 23 and 24 are sent to the selectors 25 and 26. At the selectors 25 and 26, either a level ratio D1/D2 or D2/D1 is output as the level ratio rR or rL.

In the audio signal processing apparatus 10 according to this embodiment, the audio signals of the sound source to be removed from the left channel and the audio signals of the sound source to be removed from the right channel can be selected independently. Therefore, the selectors 25 and 26 are provided for the right and left channels, respectively, so as to obtain level ratios rR and rL for the right and left channels, respectively.

In accordance with the audio signals of the sound sources to be removed from the left and right channels selected by the user and their level ratios, selection control signals SELR and SELL for selecting outputs from the level ratio calculating units 23 and 24, respectively, are sent to the selectors 25 and 26, respectively. The level ratios rR and rL obtained at the selectors 25 and 26 are sent to the frequency spectral control unit 104.

For example, if the user is to input distribution ratio values PL and PR (which are values less than one) of the left channel and the right channel, respectively, as the level ratios of the audio signals of the sound source to be removed and if the input distribution ratio values PL and PR have a relationship of $PL/PR \leqq 1$, the selection control signals SELR and SELL control the selectors 25 and 26 to select the output (D2/D1) from the level ratio calculating unit 23 as the value for the level ratios rR and rL, whereas, if the input distribution ratio values PL and PR have a relationship of $PL/PR > 1$, the selection control signals SELR and SELL control the selectors 25 and 26 to select the output (D1/D2) from the level ratio calculating unit 24 as the value for level ratios rR and rL.

If the distribution ratio values PL and PR selected by the user are equal to each other ($rR = rL = 1$), either the output from the level ratio calculating unit 23 or the output from the level ratio calculating unit 24 may be sent from the selectors 25 and 26.

Structure of Frequency Spectral Control Unit According to Third Embodiment

The frequency spectral control unit 104 according to this embodiment includes a removal coefficient generating unit 31R and a multiplying unit 32R for the right channel and a removal coefficient generating unit 31L and a multiplying unit 32L for the left channel.

The multiplying unit 32R receives a frequency spectral component F1 from a FFT unit 101 and a removal coefficient wR from the coefficient generating unit 31R. The product of the frequency spectral component F1 and the removal coefficient wR is defined as a right-channel spectral output FexR from the frequency spectral control unit 104.

The multiplying unit 32L receives a frequency spectral component F2 from a FFT unit 102 and a removal coefficient wL from the coefficient generating unit 31L. The product of the frequency spectral component F2 and the removal coefficient wL is defined as a left-channel spectral output FexL from the frequency spectral control unit 104.

The coefficient generating unit 31R receives the level ratio rR from the selector 25 of the frequency spectral comparing unit 103 and generates a removal coefficient wR corresponding to the level ratio rR. The coefficient generating unit 31L receives the level ratio rL from the selector 26 of the frequency spectral comparing unit 103 and generates a removal coefficient wL corresponding to the level ratio rL.

The coefficient generating units 31R and 31L, for example, are constituted of function generating circuits for generating functions related to removal coefficients wR or wL, wherein the level ratios rR and rL are variables. The functions used for the coefficient generating units 31R and 31L are selected in accordance with the distribution ratio values PL and PR selected by the user in accordance with the sound source to be separated.

The level ratios rR and rL sent to the coefficient generating units 31R and 31L change for each frequency spectral component. Therefore, the removal coefficients wR and wL from the coefficient generating units 31R and 31L, respectively, also change for each frequency spectral component.

As a result, at the multiplying unit 32R, the level of the frequency spectral components from the FFT unit 101 is controlled by the level ratio rR, and, at the multiplying unit 32L, the level of the frequency spectral components from the FFT unit 102 is controlled by the level ratio rL.

For example, if the level ratio from the level ratio calculating unit 23 is selected as the level ratio rR at the selector 25 and a function generating circuit having the characteristics shown in FIG. 3A is used for the coefficient generating unit 31R, right-channel audio signal components not including the audio signals S3 of a singing voice is output from the multiplying unit 32R.

Similarly, for example, if the level ratio from the level ratio calculating unit 24 is selected as the level ratio rL at the selector 26 and a function generating circuit having the characteristics shown in FIG. 3C is used for the coefficient generating unit 31L, left-channel audio signal components not including the audio signals S4 of a singing voice is output from the multiplying unit 32L.

It is also possible to send a level ratio from the same level ratio calculating unit (23 or 24) to the selectors 25 and 26 so as to output the level ratio rR and rL and to use function generating circuits having the same characteristics for the coefficient generating units 31R and 31L. In such a case, the same advantages as that of the audio signal processing apparatus shown in FIG. 1 may be obtained.

As described above, the audio signal processing apparatus 10 according to the third embodiment is capable of independently removing audio signals of sound sources from the right-channel audio signal SR and the left-channel audio signal SL.

A modification of the third embodiment may be provided in a similar manner as the audio signal processing apparatus 10 according to the second embodiment with respect to the audio signal processing apparatus 10 according to the first embodiment, by providing multiplication coefficient generating units for generating multiplication coefficients for separating the audio components of the sound source to be removed and interposing subtracting units between the multiplying unit 32R and the inverse FFT unit 105 and between the multiplying unit 32L and the inverse FFT unit 106 instead of the coefficient generating units 31R and 31L. In this way, in the same manner as the above-described third embodiment, the audio components of the sound sources to be removed can be removed from the right-channel audio signal SR and the left-channel audio signal SL by subtracting the audio components of the sound sources of the left and right channels, which are separated at the frequency spectral control unit 104, from the frequency spectral components F1 and F2.

Audio Signal Processing Apparatus According to Fourth Embodiment

An audio signal processing apparatus 10 according to the fourth embodiment is capable of dynamically changing the sound sources to be removed selected by the user from audio signals of two channels.

More specifically, the audio signal processing apparatus 10 according to the fourth embodiment has the same structure as that according to the third embodiment except that the audio signal processing apparatus 10 according to the fourth embodiment allows the user to dynamically and independently select the sound sources (different or same sound sources) to be removed from the left-channel audio signal SL and the right-channel audio signal SR.

Figure 7:
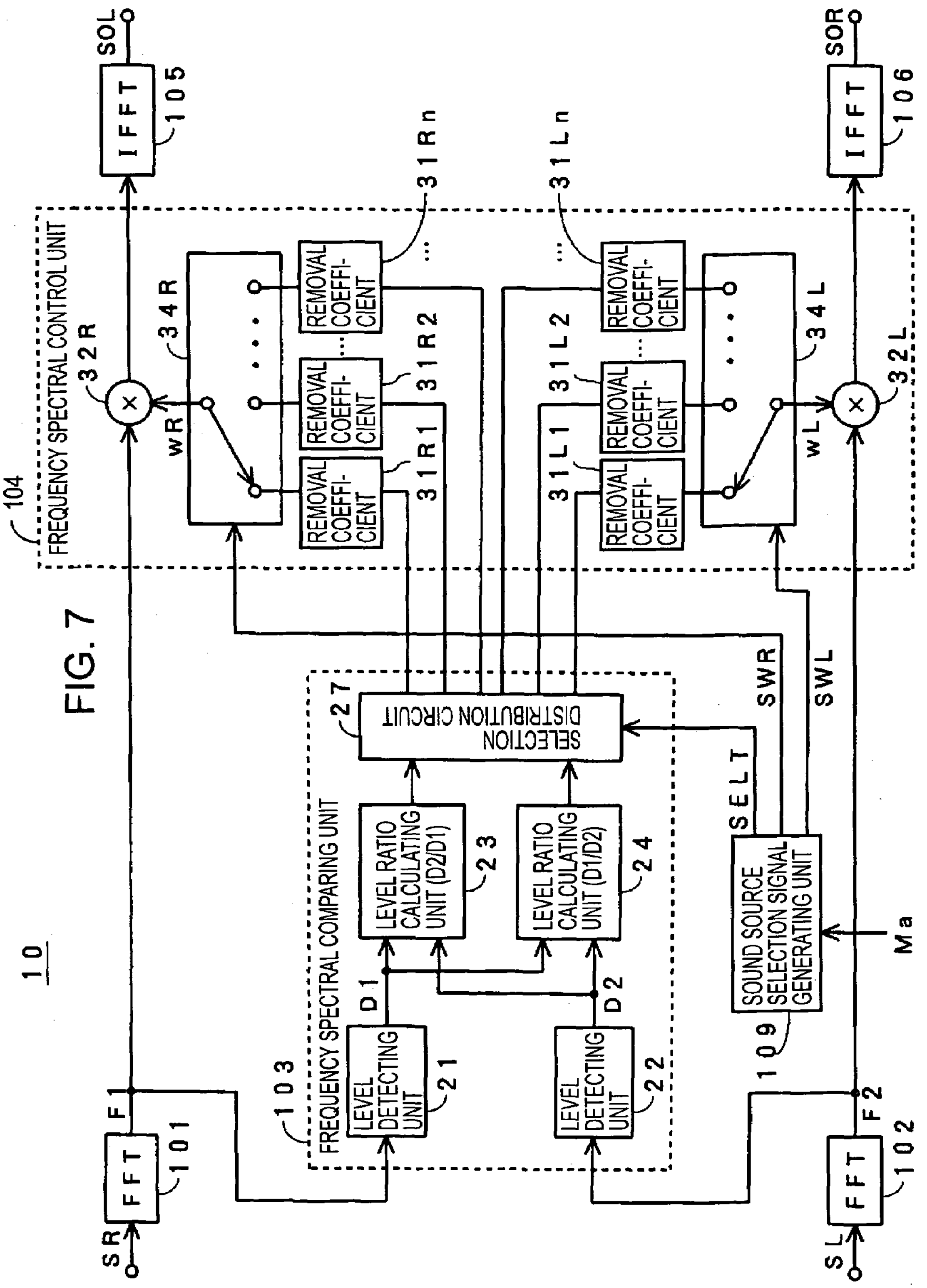
FIG. 7 is a block diagram of an audio signal processing apparatus according to a fourth embodiment of the present invention.

FIG. 7 is a block diagram of the structure of the audio signal processing apparatus 10 according to the fourth embodiment. According to the fourth embodiment, a frequency spectral control unit 104 includes a plurality of coefficient generating units 31R1, 31R2 . . . 31Rn for the right channel and a switching circuit 34R for selecting a removal coefficient wR generated at one of the coefficient generating units 31R1, 31R2 . . . 31Rn and sending this removal coefficient wR to a multiplying unit 32R.

The frequency spectral control unit 104 also includes a plurality of coefficient generating units 31L1, 31L2 . . . 31Ln for the left channel and a switching circuit 34L for selecting a removal coefficient wL generated at one of the coefficient generating units 31L1, 31L2 . . . 31Ln and sending this removal coefficient wL to a multiplying unit 32L.

For example, level ratio/removal coefficient functions used for separating sound sources of various left and right channel level ratios are set for each of the coefficient generating units 31L1, 31L2 . . . 31Ln and 31R1, 31R2 . . . 31Rn.

A frequency spectral comparing unit 103 includes a selection distribution circuit 27 for receiving one of the level ratio calculation results output from level ratio calculating units 23 and 24 and supplying the selected level ratio calculation result to each of the coefficient generating units 31L1, 31L2 . . . 31Ln and 31R1, 31R2 . . . 31Rn.

According to the fourth embodiment, a sound source selection signal generating unit 109 is provided. As described below, the sound source selection signal generating unit 109 receives a signal Ma that corresponds to the operation via a selecting unit by the user to select the sound sources to be separated, generates a selection signal SELT to be sent to the selection distribution circuit 27, and generates a signal SWL for switching the switching circuit 34L and a signal SWR for switching the switching circuit 34R.

Although not shown in the drawing, the audio signal processing apparatus 10 according to this embodiment allows the user to select sound sources to be removed through, for example, a selection knob, a button, or a graphical user interface, such a liquid crystal display having a touch panel. In such a case, the user may select sound sources from a plurality of sound sources that can be separated by the functions set for the coefficient generating units 31L1, 31L2 . . . 31Ln and 31R1, 31R2 . . . 31Rn.

For example, by removing predetermined sound sources, the position of a sound image can be gradually moved between the position of the sound image in the left channel and the position of the sound image in the right channel.

In this case, the user can independently select the sound sources to be removed for the left and right channels.

For example, if the user uses a knob, a button, or a graphical user interface to select a sound source to be separated from an left-channel audio signal SL using a removal coefficient sent from the left-channel removal coefficient generating unit 31L1, a signal Ma corresponding to the operation carried out by the user is sent to the sound source selection signal generating unit 109. Then, the sound source selection signal generating unit 109 generates a switch control signal SWL and a selection signal SELT corresponding to the signal Ma.

At this time, the switch control signal SWL from the sound source selection signal generating unit 109 switches the switching circuit 34L so as to select the coefficient generating units 31L1. The selection distribution circuit 27 receives the selection signal SELT and selects one of the level ratio calculating units 23 and 24 (whichever has a level ratio less than one) and send the selected level ratio to the coefficient generating units 31L1.

As a result, the multiplication unit 32L outputs an audio signal FexL not including frequency spectral components for the selected sound sources. The output audio signal FexL is reconverted into the original time-sequential audio signal at an inverse FFT unit 106 and is output as an output signal SOL.

In the same manner, audio signals of the sound source selected by the user are also removed from the right channel.

The audio signal processing apparatus 10 according to the fourth embodiment illustrated in FIG. 7 is capable of separating audio signals of predetermined sound sources from the left and the right channels (in the same manner as the audio signal processing apparatus 10 according to the second embodiment). However, the structure according to the fourth embodiment may also be applied to structures according to the first embodiment and other embodiments described below.

More specifically, when the structure according to the fourth embodiment is applied to structures according to the first embodiment, as illustrated in FIG. 1, the plurality of removal coefficient generating units 31L1, 31L2 . . . 31Ln and 31R1, 31R2 . . . 31Rn are provided instead of the removal coefficient generating unit 31 and the switching circuits 34L and 34R are provided between the plurality of removal coefficient generating units 31L1, 31L2 . . . 31Ln and the multiplying units 32L and between the plurality of removal coefficient generating units 31R1, 31R2 . . . 31Rn and the multiplying units 32R so as to supply a removal coefficient from one of the removal coefficient generating units 31L1, 31L2 . . . 31Ln or 31R1, 31R2 . . . 31Rn. Moreover, the sound source selection signal generating unit 109 is provided. The sound source selection signal generating unit 109 is capable of receiving a selection signal Ma from the user and switches the switching circuit and generates a signal for controlling the level ratio calculating units 23 and 24 so that one of the more suitable outputs from the level ratio calculating units 23 and 24 is sent to the removal coefficient generating units 31L1, 31L2 . . . 31Ln or 31R1, 31R2 . . . 31Rn.

A modification of the third embodiment may be provided in a similar manner as the audio signal processing apparatus 10 according to the second embodiment with respect to the audio signal processing apparatus 10 according to the first embodiment, by providing multiplication coefficient generating units for generating multiplication coefficients for separating the audio components of the sound source to be removed and interposing subtracting units between the multiplying unit 32R and the inverse FFT unit 105 and between the multiplying unit 32L and the inverse FFT unit 106 instead of the coefficient generating units 31R and 31L. In this way, in the same manner as the above-described fourth embodiment, the audio components of the sound sources to be removed can be removed from the right-channel audio signal SR and the left-channel audio signal SL by subtracting the audio components of the sound sources of the left and right channels, which are separated at the frequency spectral control unit 104, from the frequency spectral components F1 and F2.

Audio Signal Processing Apparatus According to Fifth Embodiment

In the above-described embodiments, if a plurality of audio signals of a sound source is distributed and mixed at the same level ratio or with the same level difference in the left and right channels, all of these audio signals are removed. According to the fifth embodiment, predetermined audio components of sound sources that are difficult to be removed on the basis of level ratio and/or level difference can be removed.

According to the fifth embodiment, when the main frequency bands of the audio components of the sound sources that are difficult to be removed on the basis of level ratio and/or level difference differ, the audio components of the sound sources are removed on the basis of the difference in their frequency bands.

Figure 8:
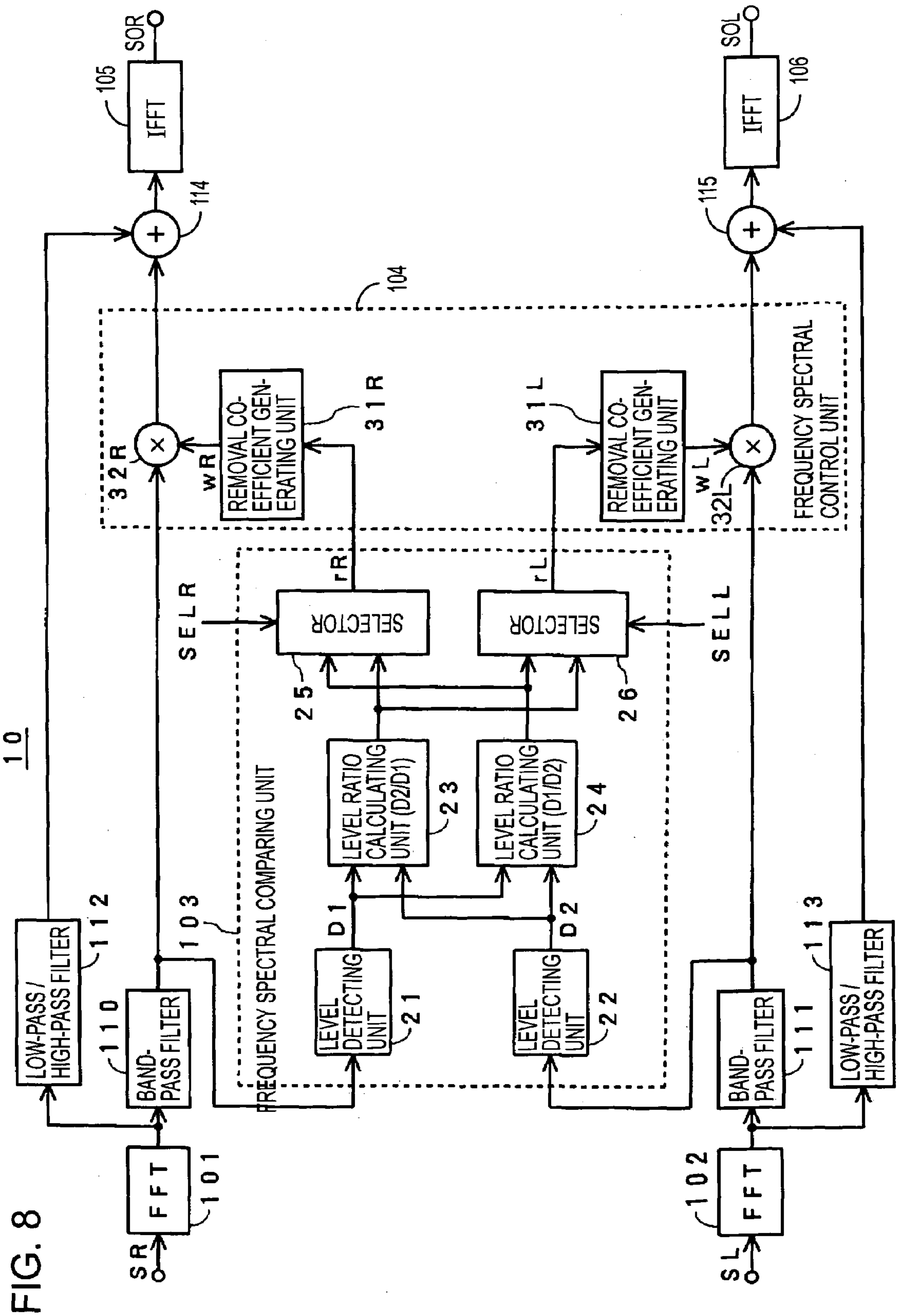
FIG. 8 is a block diagram of an audio signal processing apparatus according to a fifth embodiment of the present invention.

FIG. 8 is a block diagram of the structure of an audio signal processing apparatus 10 according to the fifth embodiment. According to the fifth embodiment, band-pass filters 110 and 111 for separating the signal components of the frequency bands including the audio components of the sound source to be removed are provided on the output side of a FFT unit 101 and a FFT unit 102, respectively. Moreover, low-pass/high-pass filters 112 and 113 for separating signal components of frequency bands except for the frequency band that mainly includes the audio components of the sound source to be removed are provided on the output side of a FFT unit 101 and a FFT unit 102, respectively.

Furthermore, an adding units 114 is interposed between a multiplying unit 32R of a frequency spectral control unit 104 and an inverse FFT unit 105, and an adding unit 115 is interposed between a multiplying unit 32L of the frequency spectral control unit 104 and an inverse FFT unit 106.

A frequency spectral component F1 output from the FFT unit 101 is sent to the band-pass filter 110 and the low-pass/high-pass filters 112. The signal components of the frequency band that mainly includes the audio components of the sound source to be removed is separated at the band-pass filter 110 and is sent to a level detecting unit 21 of a frequency spectral comparing unit 103 and the multiplying unit 32R of the frequency spectral control unit 104.

The signal components of frequency bands except for the frequency band that mainly includes the audio components of the sound source to be removed is separated at the low-pass/high-pass filters 112 and is sent to the adding unit 114. The adding unit 114 also receives an output FexR from the frequency spectral control unit 104. The addition results obtained at the adding unit 114 are sent to the inverse FFT unit 105.

A frequency spectral component F2 output from the FFT unit 102 is sent to the band-pass filter 111 and the low-pass/high-pass filters 113. The audio signal components of frequency band that mainly includes the audio components of the sound source to be removed is separated at the band-pass filter 111 and is sent to a level detecting unit 22 of a frequency spectral comparing unit 103 and the multiplying unit 32L of the frequency spectral control unit 104.

The audio signal components of frequency bands except for the frequency band that mainly includes the audio components of the sound source to be removed is separated at the low-pass/high-pass filters 113 and is sent to the adding unit 115. The adding unit 115 also receives an output FexL from the frequency spectral control unit 104. The addition results obtained at the adding unit 115 are sent to the inverse FFT unit 106.

The frequency spectral comparing unit 103 and the frequency spectral control unit 104 according to the fifth embodiment only remove the signal components of frequency bands except for the frequency band that mainly includes the audio components of the sound source to be removed. Then, the resulting outputs FexR and FexL are added to the frequency band components that were not processed to remove sound sources at the adding units 114 and 115, and the results of the addition are sent to the inverse FFT units 105 and 106, respectively.

Accordingly, even when a plurality of sound source components of audio signals are distributed among two channels at the same level ratio or with the same level difference, so long as the main frequency bands including the audio components of the sound source differ, the audio components of the sound source to be removed can be removed from each of the channels by employing the structure according to the fifth embodiment.

A modification of the fifth embodiment may be provided in a similar manner as the audio signal processing apparatus 10 according to the second embodiment with respect to the audio signal processing apparatus 10 according to the first embodiment, by providing multiplication coefficient generating units for generating multiplication coefficients for separating the audio components of the sound source to be removed and interposing subtracting units between the multiplying unit 32R and the adding unit 114 and between the multiplying unit 32L and the adding unit 115 instead of the coefficient generating units 31R and 31L. In this way, in the same manner as the above-described fourth embodiment, the audio components of the sound sources to be removed can be removed from the right-channel audio signal SR and the left-channel audio signal SL by subtracting the audio components of the sound sources of the left and right channels, which are separated at the frequency spectral control unit 104, from the frequency spectral components F1 and F2.

Audio Signal Processing Apparatus According to Sixth Embodiment

According to the sixth embodiment, predetermined audio components are removed when the audio components of sound sources that are difficult to be removed only on the basis of level ratio and/or level difference.

In the above-described embodiments, the audio signals of the sound sources are distributed among two channels in the same phase. However, in other cases, the audio signals may be distributed among the two channels in inverse phases. An exemplary case represented by Formulas 3 and 4 will be described below wherein audio signals S1 to S6 from six sound sources MS1 to MS6 are distributed among left and right channels as stereo audio signals SL and SR.

$$SL=S1+0.9S2+0.7S3+0.4S4+0.7S6 \quad (3)$$

$$SR=S5+0.4S2+0.7S3+0.9S4-0.7S6 \quad (4)$$

More specifically, the audio signal S3 from the sound source MS3 and the audio signal S6 from the sound source MS6 are distributed among the left and right channels at the same level. However, the audio signal S3 from the sound source MS3 is distributed among the left and right channels at the same phase, but the audio signal S6 from the sound source MS6 is distributed among the left and right channels at the different phases.

If the audio signal S3 from the sound source MS3 or the audio signal S6 from the sound source MS6 is to be removed only on the basis of level ratio and/or level difference without taking into consideration the phases of the audio signals S3 and S6 in the left and right channels, one of the audio signals S3 and S6 are difficult to be removed since the audio signals S3 and S6 are distributed among the left and right channels at the same level.

According to the sixth embodiment, audio components of the sound sources are first separated using the level ratio and/or the level difference of the two channels and then separated using the phase difference. The separated audio components of the sound sources are subtracted from outputs F1 and F1 from FFT units 101 and 102, respectively, so as to remove audio components of predetermined sound sources.

Figure 9:
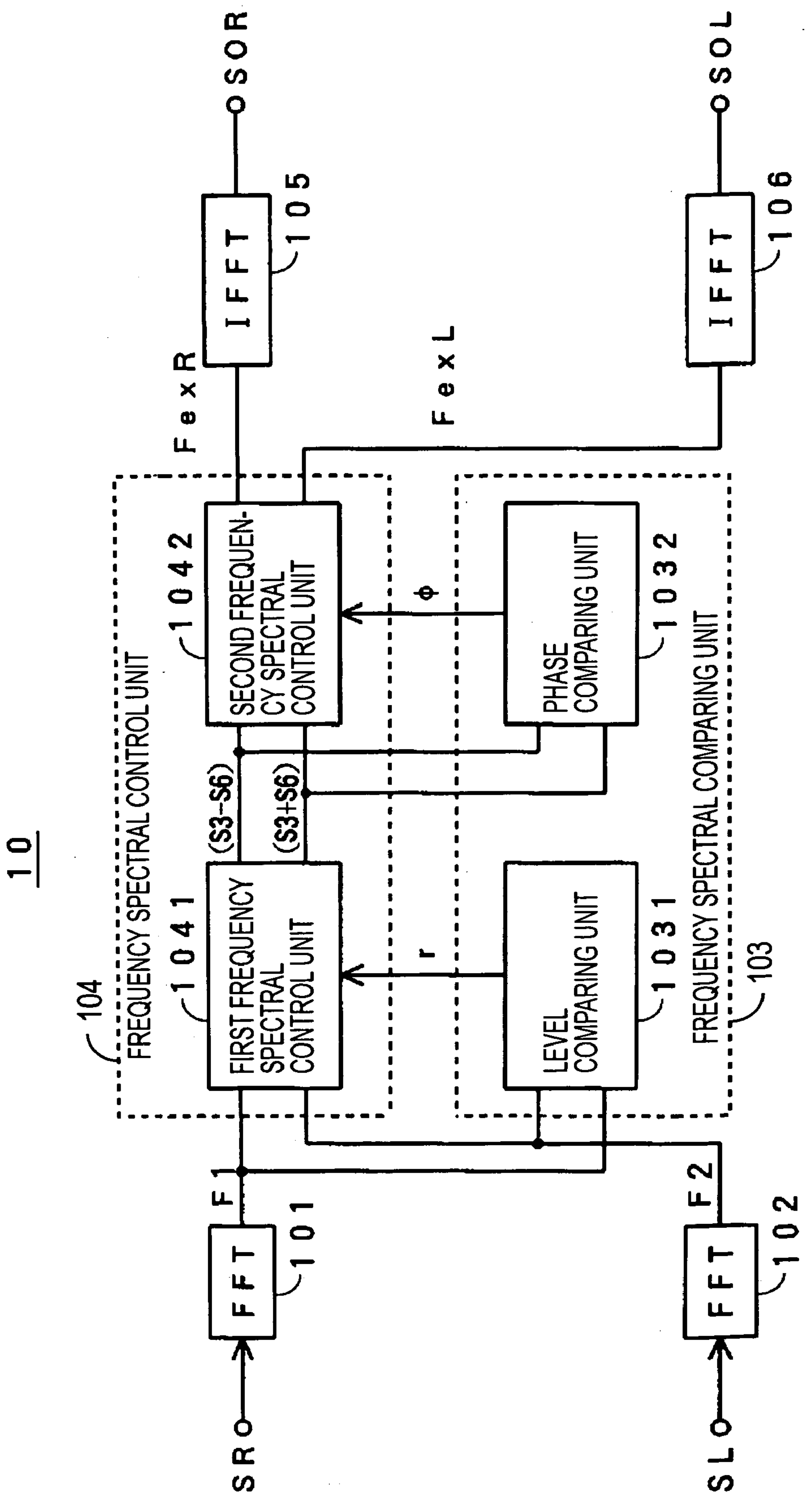
FIG. 9 is a block diagram of an audio signal processing apparatus according to a sixth embodiment of the present invention.

FIG. 9 is a block diagram of the structure of an audio signal processing apparatus 10 according to the sixth embodiment. The audio signal processing apparatus 10 according to the sixth embodiment includes a frequency spectral comparing unit 103, a level comparing unit 1031, and a phase comparing unit 1032.

The frequency spectral control unit 104 according to the sixth embodiment includes a first frequency spectral control unit 1041 and a second frequency spectral control unit 1042 for separating audio signals of sound sources on the basis of phase difference.

Figure 10:
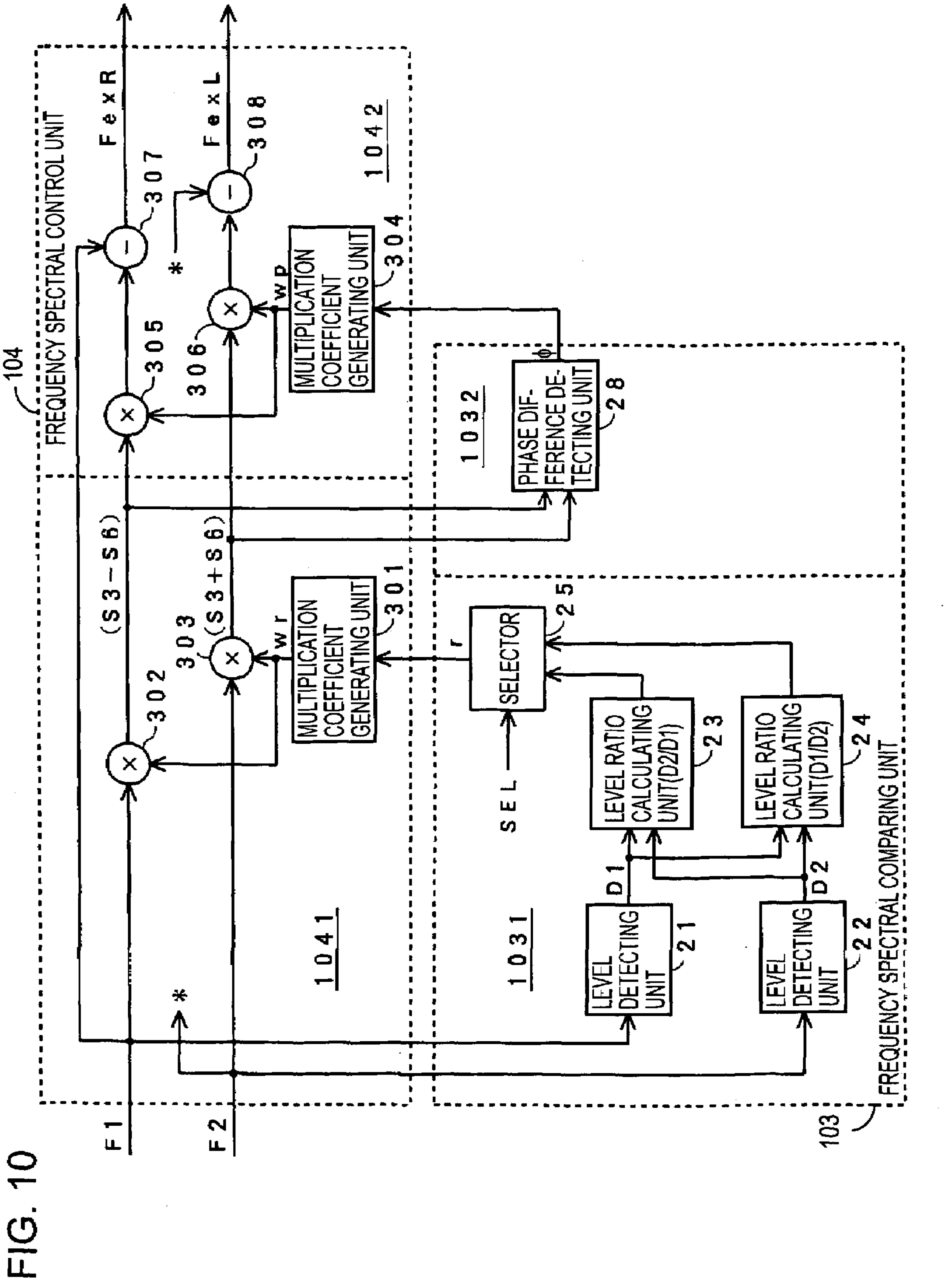
FIG. 10 is a block diagram of the main components of the audio signal processing apparatus according to the sixth embodiment illustrated in FIG. 9.

FIG. 10 is a block diagram of the detailed structures of the frequency spectral comparing unit 103 and the frequency spectral control unit 104. The structure of the level comparing unit 1031 of the frequency spectral comparing unit 103 is similar to that of the frequency spectral comparing unit 103 according to the first embodiment and includes level detecting units 21 and 22, level ratio calculating units 23 and 24, and a selector 25.

The first frequency spectral control unit 1041 of the frequency spectral control unit 104 has substantially the same structure as that of the above-described frequency spectral control unit according to the second embodiment and includes a multiplication coefficient generating unit 301 and a sound source separating unit including multiplying units 302 and 303.

As illustrated in FIGS. 9 and 10, a level ratio output r from the level comparing unit 1031 is sent to the multiplication coefficient generating unit 301 of the first frequency spectral control unit 1041 in the same manner according to the first embodiment. Then, the multiplication coefficient generating unit 301 generates a multiplication coefficient wr corresponding to the function set for the multiplication coefficient generating unit 301. The generated multiplication coefficient wr is sent to the multiplying units 302 and 303.

The multiplying unit 302 receives a frequency spectral component F1 from the FFT unit 101 and obtains the multiplication result of the frequency spectral component F1 and the multiplication coefficient wr. The multiplying unit 303 receives a frequency spectral component F2 from the FFT unit 102 and obtains the multiplication result of the frequency spectral component F2 and the multiplication coefficient wr.

In other words, the multiplying units 302 and 303 controls the level of the frequency spectral components F1 and F2 from the FFT units 101 and 102, respectively, in accordance with the multiplication coefficient wr from the removal coefficient generating unit 31 and outputs these the frequency spectral components F1 and F2.

Similar to the second embodiment, the multiplication coefficient generating unit 301 is constituted of a function generating circuit for generating a function related to the multiplication coefficient wr in which a level ratio r is a variable. The function to be used for the multiplication coefficient generating unit 301 is selected on the basis of the audio signals in the left and right channels of the sound sources to be separated.

As described above, a function related to the level ratio of the multiplication coefficient wr having characteristics as shown in one of FIGS. 5A to 5D is set for the multiplication coefficient generating unit 301. For example, a predetermined function having the characteristics shown in FIG. 5A, as described above, is set for the multiplication coefficient generating unit 301 to separate audio signals of sound sources distributed among the left and right channels at the same level.

According to the sixth embodiment, the outputs of the multiplying units 302 and 303 are sent to the phase comparing unit 1032 of the frequency spectral comparing unit 103 and the second frequency spectral control unit 1042 of the frequency spectral control unit 104.

As illustrated in FIG. 10, the phase comparing unit 1032 includes a phase difference detecting unit 28 for detecting the phase difference $\phi$ of the outputs from the multiplying units 302 and 303. The phase comparing unit 1032 sends information on the phase difference to the second frequency spectral control unit 1042.

The second frequency spectral control unit 1042 includes a multiplication coefficient generating unit 304, multiplying units 305 and 306, and subtracting units 307 and 308.

The multiplying unit 305 receives an output from the multiplying unit 302 of the first frequency spectral control unit 1041 and a multiplication coefficient wp from the multiplication coefficient generating unit 304. The multiplication result of the output from the multiplying unit 302 and the multiplication coefficient wp is sent from the multiplying unit 305 to the subtracting unit 307. The subtracting unit 307 receives the output F1 from the FFT unit 101 and subtracts the output from the multiplying unit 305 from this output F1. The subtraction result is output as a first output (right channel) FexR from the frequency spectral control unit 104.

The multiplying unit 306 receives an output from the multiplying unit 303 of the first frequency spectral control unit 1041 and a multiplication coefficient wp from the multiplication coefficient generating unit 304. The multiplication result of the output from the multiplying unit 303 and the multiplication coefficient wp is sent from the multiplying unit 306 to the subtracting unit 308. The subtracting unit 308 receives the frequency spectral component F2 from the FFT unit 102 and subtracts the output from the multiplying unit 306 from this frequency spectral component F2. The subtraction result is output as a second output (left channel) FexL from the frequency spectral control unit 104.

The multiplication coefficient generating unit 304 receives information on the phase difference $\phi$ from the phase difference detecting unit 28 and generates a multiplication coefficient wp corresponding to the phase difference $\phi$. The multiplication coefficient generating unit 304 is constituted of a function generating circuit for generating a function related to the multiplication coefficient wp in which the phase difference $\phi$ is a variable. The function to be used for the multiplication coefficient generating unit 304 is selected by the user in accordance with phase difference of the audio signal of the sound source between the left and right channels.

The phase difference φ sent to the multiplication coefficient generating unit 304 changes in increments of frequency components of the frequency spectral components. Therefore, at the multiplying units 305 and 306, the level of the frequency spectral components from the multiplying units 302 and 303 are controlled by the multiplication coefficient wp.

FIGS. 11A to 11E illustrate examples of functions used for the function generating circuit of the multiplication coefficient generating unit 304.

Figure 11A:
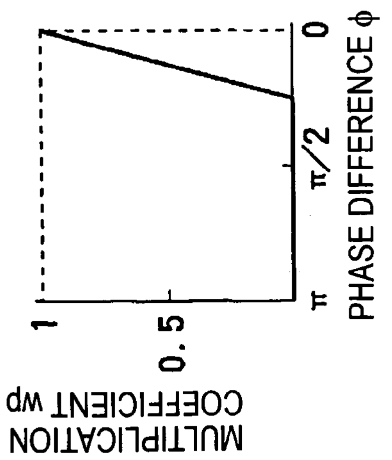
FIGS. 11A to 11E illustrate examples of functions set for a multiplication coefficient generating unit illustrated in FIG. 10.

According to the function having the characteristics shown in FIG. 11A, if the phase difference φ of the left and right channels is 0 or almost 0, i.e., if the phases of the frequency spectral components of the left and right channels are the same or almost the same, the multiplication coefficient wp is 1 or almost 1, whereas, if the phase difference φ of the left and right channels is larger than about π/4, the multiplication coefficient wp is 0.

For example, if the function having the characteristics shown in FIG. 11A is set for the multiplication coefficient generating unit 304, the multiplication coefficient wp corresponding to a frequency spectral component having a phase difference φ of 0 obtained at the phase difference detecting unit 28 is 1 or almost 1. Therefore, the multiplying units 305 and 306 output the frequency spectral components at their original levels. In contrast, since the multiplication coefficient wp corresponding to a frequency spectral component having a phase difference φ from the phase difference detecting unit 28 of more than about π/4 is 0, the output level of the frequency spectral components to be output from the multiplying units 305 and 306 are 0 and the he frequency spectral components are not output.

More specifically, the multiplying units 305 and 306 output frequency spectral components that are in the same phases and almost in the same phases at their original levels and do not output frequency spectral components that have a great phase difference by setting their output level to 0. As a result, only the frequency spectral components that are distributed among the left-channel audio signal SL and the right-channel audio signal SR in the same phases are output from the multiplying units 305 and 306.

In other words, the function having the characteristics shown in FIG. 11A is used to separate signals of a sound source distributed in the same phases in the left and the right channels.

Figure 11B:
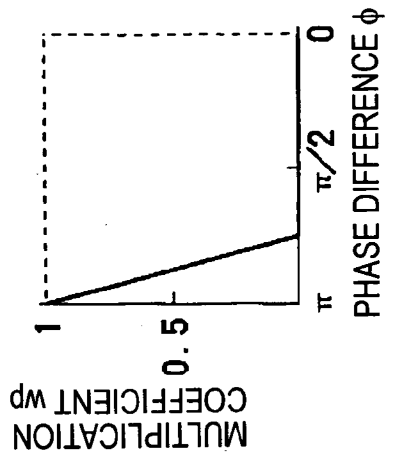

According to the function having the characteristics shown in FIG. 11B, if the phase difference φ of the left and right channels is π or almost π, i.e., if the frequency spectral components of the left and right channels are in opposite phases or almost opposite phases, the multiplication coefficient wp is 1 or almost 1, whereas, if the phase difference φ of the left and right channels is less than about 3π/4, the multiplication coefficient wp is 0.

For example, if the function having the characteristics shown in FIG. 11B is set for the multiplication coefficient generating unit 301, the multiplication coefficient wp corresponding to a frequency spectral component having a phase difference φ of 0 obtained at the phase difference detecting unit 28 is π or almost π. Therefore, the multiplying units 305 and 306 output the frequency spectral components at their original levels. In contrast, since the multiplication coefficient wp corresponding to a frequency spectral component having a phase difference φ from the phase difference detecting unit 28 of less than about 3π/4 is 0, the output level of the frequency spectral components to be output from the multiplying units 305 and 306 are 0 and the he frequency spectral components are not output.

More specifically, the multiplying units 305 and 306 output frequency spectral components that are in the same phases and almost in the same phases at their original levels and do not output frequency spectral components that have a great phase difference by setting their output level to 0. As a result, only the frequency spectral components that are distributed among the left-channel audio signal SL and the right-channel audio signal SR in the same phases are output from the multiplying units 305 and 306.

In other words, the function having the characteristics shown in FIG. 11B is used to separate signals of a sound source distributed in opposite phases in the left and the right channels.

Figure 11C:
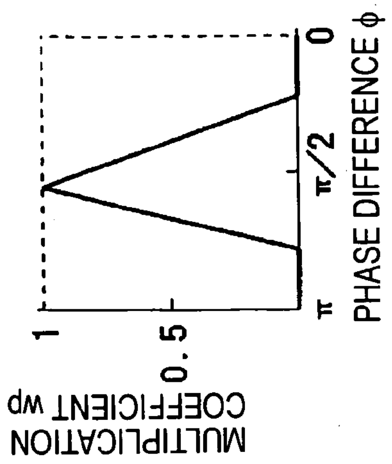

Similarly, according to the function having the characteristics shown in FIG. 11C, if the phase difference φ of the left and right channels is about π/2 or almost π/2, the multiplication coefficient wp is 1 or almost 1, whereas, if the phase difference φ of the left and right channels is other than about π/2 or almost π, the multiplication coefficient wp is 0. In this way, the function having the characteristics shown in FIG. 11C is used to separate signals of a sound source distributed in phases different by about π/2 to each other in the left and the right channels.

Figure 11D:
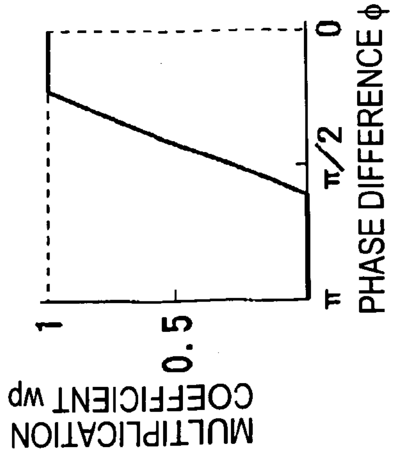
Figure 11E:
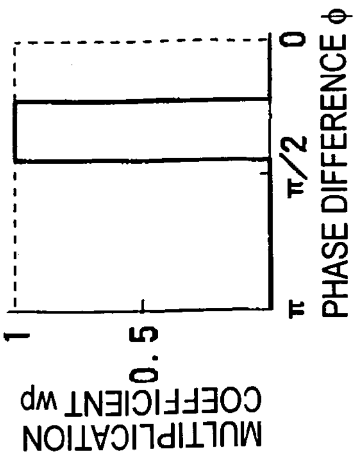

In addition, functions having characteristics shown in FIGS. 11D and 11E may be set for the multiplying units 305 and 306 in accordance with the phase difference when the audio signals of the sound sources to be separated are distributed.

According to the sixth embodiment, if an audio signal S3 of a sound source MS3 distributed among the left and right channels at the same level and in the same phase and an audio signal S6 of an sound source MS6 is distributed among the left and right channels at the same level but in opposite phases, to remove only the audio signal S3 of the sound source MS3 from the left-channel audio signal SL and the right-channel audio signal SR represented by Formulas 3 and 4, a function having the characteristics shown in FIG. 5A is set for the multiplication coefficient generating unit 301 of the first frequency spectral control unit 1041 and a function having the characteristics shown in FIG. 11B is set for the multiplication coefficient generating unit 304 of the second frequency spectral control unit 1042.

In this way, as illustrated in FIGS. 9 and 10, a frequency spectral component (S3−S6) included in the frequency spectral component F1 that is obtained by carrying out fast Fourier transform (FFT) on the right-channel audio signal SR is obtained at the multiplying unit 302 of the first frequency spectral control unit 1041 of the frequency spectral control unit 104, and a frequency spectral component (S3+S6) included in the frequency spectral component F2 that is obtained by carrying out fast Fourier transform (FFT) on the left-channel audio signal SL is obtained at the multiplying unit 303. In other words, the signals S3 and S6 are distributed among the left and right channels at the same level the signals S3 and S6 are not removed at the first frequency spectral control unit 1041 and are output.

According to the sixth embodiment, the signals S3 and S6 are separated on the basis of the fact that the signals S3 and S6 are distributed among the left and right channels in opposite phases.

More specifically, the outputs from the multiplying units 302 and 303 are sent to the phase difference detecting unit 28 constituting the phase comparing unit 1032 of the frequency spectral comparing unit 103 and the phase difference φ of the outputs are detected. Then, the information on the phase difference ϕ detected at the phase difference detecting unit 28 is sent tot eh multiplication coefficient generating unit 304.

Since a function having the characteristics shown in FIG. 11A is set for the multiplication coefficient generating unit 304, the multiplying units 305 and 306 separates the audio signal S3 distributed among the left and right channels in the same phase. More specifically, the frequency spectral components of the audio signal S3 of the sound source MS3 included in the frequency spectral component (S3+S6) and the frequency spectral component (S3−S6) in the same phase are obtained at the multiplying units 305 and 306 and are sent to the subtracting units 307 and 308.

Accordingly, the output signal FexR, which is obtained by removing the frequency spectral component of the audio signal S3 of the sound source MS3 from the frequency spectral component F1, is derived from the subtracting unit 307 and is sent to the inverse FFT unit 105. The output signal FexL, which is obtained by removing the frequency spectral component of the audio signal S3 of the sound source MS3 from the frequency spectral component F2, is derived from the subtracting unit 308 and is sent to the inverse FFT unit 106. The outputs are reconverted into time-sequential signals at the inverse FFT units 105 and 106 and are output as output signals SOR and SOL.

According to the sixth embodiment illustrated in FIGS. 9 and 10, the signals S3 and S6 that are difficult to be separated using level ratio at the first frequency spectral control unit 1041 can be separated at the second frequency spectral control unit 1042 by using multiplication coefficients and multiplying units since the signal S6 is in an opposite phase as the signal S3. However, it is also possible to separate one of the two signals that are difficult to be separated using level ratio by using phase difference ϕ and a multiplication coefficient, and separate the other signal of the two signals by subtracting the separated signal from the sum of the signals from the first frequency spectral control unit 1041 (a signals obtained by adding the outputs of the multiplying units 302 and 303).

Audio Signal Processing Apparatus According to Seventh Embodiment

Figure 12:
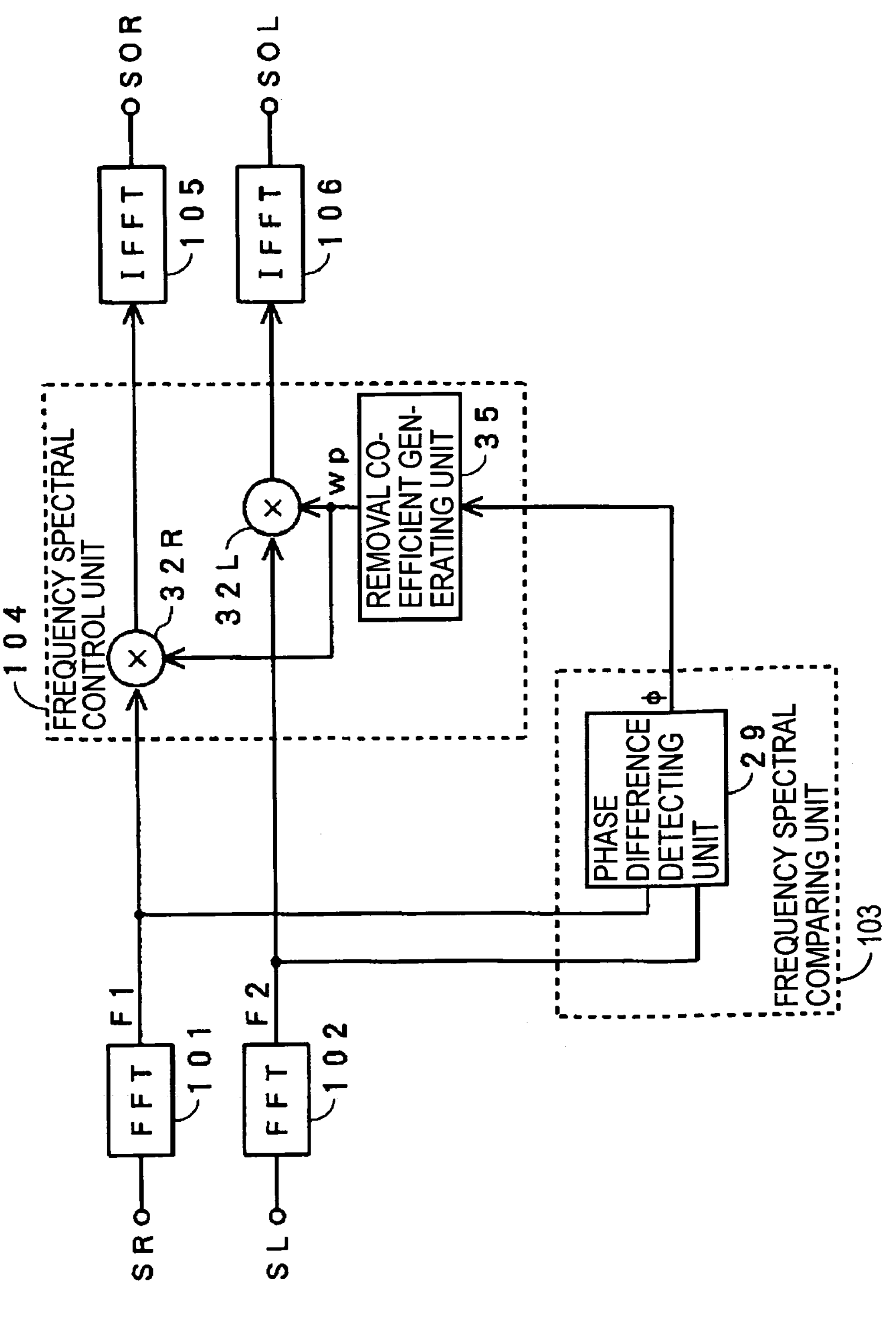
FIG. 12 is a block diagram of an audio signal processing apparatus according to a seventh embodiment of the present invention.

According to a seventh embodiment of the present invention, a predetermined sound source is separated on the basis of a phase difference of frequency spectral components of left and right channels. FIG. 12 is a block diagram of an audio signal processing apparatus 10 according to the seventh embodiment.

In the seventh embodiment, a frequency spectral comparing unit 103 includes a phase difference detecting unit 29. A frequency spectral component F1 from a FFT unit 101 and a frequency spectral component F2 from a FFT unit 102 are sent to the phase difference detecting unit 29 and a frequency spectral control unit 104. The frequency spectral control unit 104, as similar to that illustrated in FIG. 1, includes a removal coefficient generating unit 35 and multiplying units 32R and 32L. However, unlike that illustrated in FIG. 1, the removal coefficient generating unit 35 receives a phase difference ϕ as an input and outputs a removal coefficient wp.

The operation of the audio signal processing apparatus 10 according to the seventh embodiment is exactly the same as the operation of the audio signal processing apparatus 10 according to the sixth embodiment if the multiplication coefficient generating units are replaced by removal coefficient generating in the phase comparing unit 1032 and the second frequency spectral control unit 1042.

More specifically, a function generating circuit for generating a function having characteristics in which when the audio components of the sound source to be removed is distributed among the left and right channels with a phase difference ϕ, the remove coefficient wp is 0 and the remove coefficient wp when the phase difference is other than ϕ is 1 is provided for the removal coefficient generating unit 35. For example, for the left-channel audio signal SL and the right-channel audio signal SR represented by Formulas 3 and 4, if a function generating circuit for generating a function having the characteristics shown in FIG. 11B is provided for the removal coefficient generating unit 35, the outputs from the frequency spectral control unit 104 do not include the audio signal S6 of the sound source MS2 distributed in the left and right channels in opposite phases.

A modification of the seventh embodiment, in a similar manner as the second embodiment, may be constructed by replacing the removal coefficient generating unit 35 with a multiplication coefficient generating unit for separating audio signals of a predetermined sound source included in the frequency spectral components F1 and F2 and interposing a subtracting unit between the frequency spectral control unit 104 and the inverse FFT units 105 and 106 for subtracting outputs from the multiplying units 32R and 32L of the frequency spectral control unit 104 from the frequency spectral components F1 and F2.

Audio Signal Processing Apparatus According to Eighth Embodiment

Figure 13:
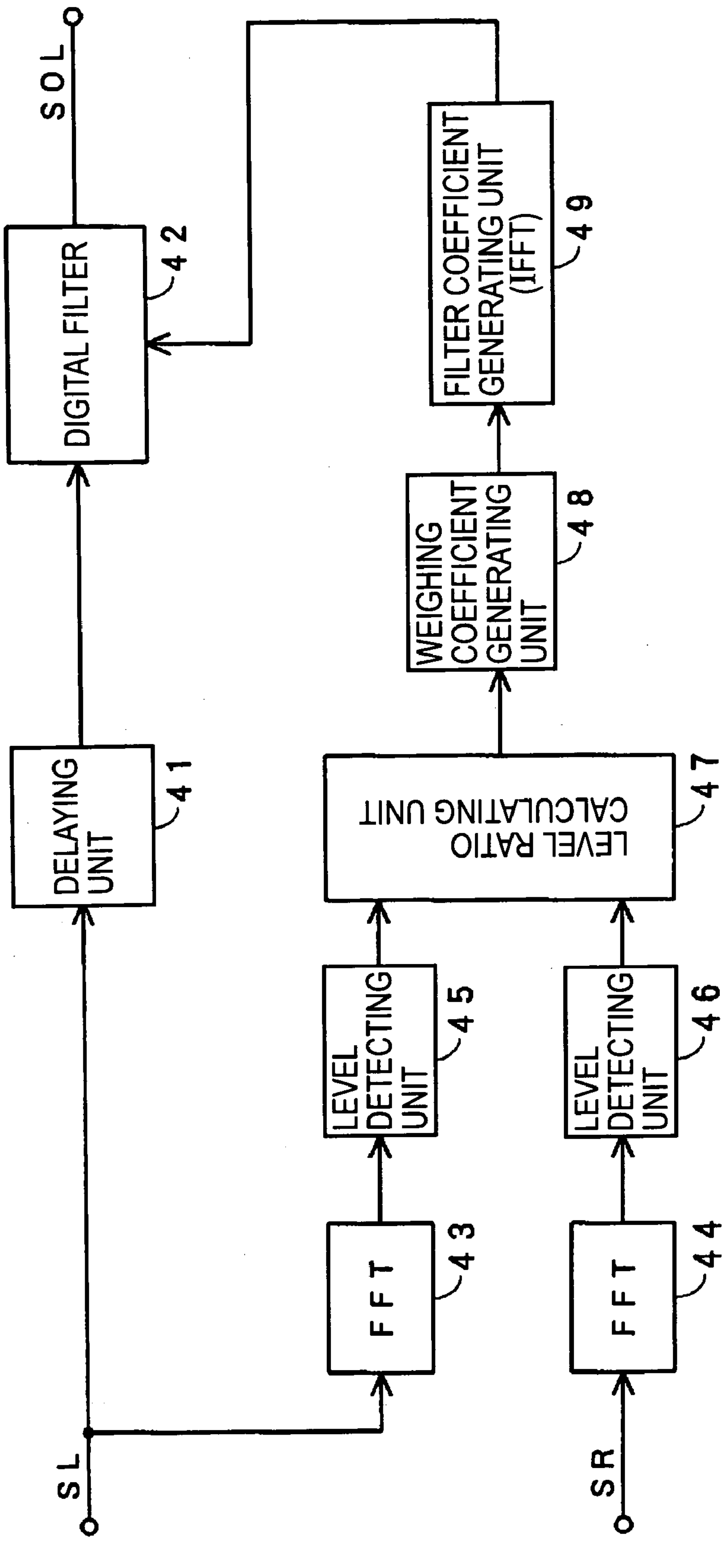
FIG. 13 is a block diagram of an audio signal processing apparatus according to an eighth embodiment of the present invention.

FIG. 13 is a block diagram of the structure of an audio signal processing apparatus 10 according to an eight embodiment of the present invention. In FIG. 13, audio signals of a sound source distributed among the left and right channels at a predetermined level ratio or with a predetermined level difference are removed from one of the left-channel audio signal SL and the right-channel audio signal SR (i.e., the left-channel audio signal SL in the case shown in the drawing) using a digital filter.

More specifically, the left-channel audio signal SL (which, in this case, is a digital signal) is sent to a digital filter 42 via a delaying unit 41 for adjusting the timing of the signal. As described below, the digital filter 42 receives a filter coefficient (corresponding to a removal coefficient) generated on the basis of the level ratio of the audio signals of the sound source to be removed. Then, the digital filter 42 outputs an output signal SOL that is generated by removing the audio signal of the sound source to be removed from the left-channel audio signal SL.

The filter coefficient is generated as described below. First, the left-channel audio signal SL and the right-channel audio signal SR (digital signals) are sent to a FFT unit 43 and a FFT unit 44, respectively, and are processed by fast Fourier transform (FFT) so that the time-sequential audio signals are converted into frequency domain data. The FFT units 43 and 44 output frequency spectral components F1 and F2, respectively. The plurality of frequency spectral components F1 and F2 have frequencies that differ from each other.

The frequency spectral components from the FFT units 43 and 44 are sent to level detecting units 45 and 46, respectively, wherein the amplitude spectra or the power spectra are detected so as to determine the levels of the frequency spectral components. Then, level values D1 and D2 detected at the level detecting units 45 and 46, respectively, are sent to a level ratio calculating unit 47 where the level ratio D1/D2 or D2/D1 is calculated.

The level ratio value calculated at the level ratio calculating unit 47 is sent to a weighing coefficient generating unit 48. The weighing coefficient generating unit 48 corresponds to the removal coefficient generating unit according to the embodiments described above and outputs a weighing coefficient of 0 or a significantly small value for the mixed level ratio of the audio signals of the left and right channels of the sound source to be removed or a level ratio almost equal to the mixed level ratio. At other level ratios, the weighing coefficient generating unit 48 outputs a weighing coefficient of 1 or a significantly large value. The weighing coefficient is determined for each frequency of the frequency spectral components of the outputs of the FFT units 43 and 44.

The weighing coefficient of a frequency domain generated at the weighing coefficient generating unit 48 is sent to a filter coefficient generating unit 49 and is converted into a filter coefficient of a time axis domain. The filter coefficient generating unit 49 generates a filter coefficient to be sent to the digital filter 42 by carrying out inverse fast Fourier transform (inverse FFT).

The filter coefficient from the filter coefficient generating unit 49 is sent to the digital filter 42. The digital filter 42 outputs an output SOL not including the audio signal components corresponding to the function set by the weighing coefficient generating unit 48. The delaying unit 41 adjusts processing delaying time, i.e., adjusts the timing of generating the filter coefficient to be sent to the digital filter 42 for the left-channel audio signal SL.

In the description above, only the left-channel audio signal SL was described with reference to FIG. 13. For the right-channel audio signal SR, the audio components of a predetermined sound source can be removed in the same manner as the left-channel audio signal SL wherein a digital filter system for receiving the right-channel audio signal SR via the delaying unit is provided and a filter coefficient is sent from the filter coefficient generating unit 49 to the digital filter for the right channel.

In the structure illustrated in FIG. 13, only the level ratio was processed. However, structures that process only a phase difference or process a level ratio and phase difference in combination may be provided as well. More specifically, although not illustrated in the drawings, when a level ratio and phase difference are processed in combination, outputs from the FFT units 43 and 44 are also sent to the phase difference detecting unit and the detected phase difference is also sent to the weighing coefficient generating unit. In this case, the weighing coefficient generating unit includes a function generating circuit that generates a weighing coefficient in which variables includes not only the level difference of the audio signals of the left and right channels of a sound source to be removed but also the phase difference.

In other words, the weighing coefficient generating unit, in this case, generates a large weighing coefficient when the level ratio is equal to or almost equal to the level ratio of the audio signals of the left and right channels of a sound source to be removed and when the phase difference is equal to or almost equal to the phase difference of the audio signals of the left and right channels of a sound source to be removed and generates a small weighing coefficient when the level ratio and the phase difference equal any other value.

By carrying out inverse fast Fourier transform (inverse FFT) to the weighing coefficient generated at the weighing coefficient generating unit, the weighing coefficient is converted into a filter coefficient for the digital filter 42.

Audio Signal Processing Apparatus According to Other Embodiment

In the above-described embodiments, it is difficult to carry out fast Fourier transform (FFT) on an input audio signal that is a long time-sequential signal, such as a signal for music. Therefore, the time-sequential signal is sectioned into a predetermined number of analyzing sections and fast Fourier transform (FFT) is carried out each of these sections.

However, if the time-sequential signal is simply sectioned into sections having a predetermined length and if the sections are recombined by carrying out inverse fast Fourier transform (inverse FFT) after removing a predetermined sound source, discontinuous waveforms are formed at the points of recombination and noise is generated in the sound.

Figure 14:
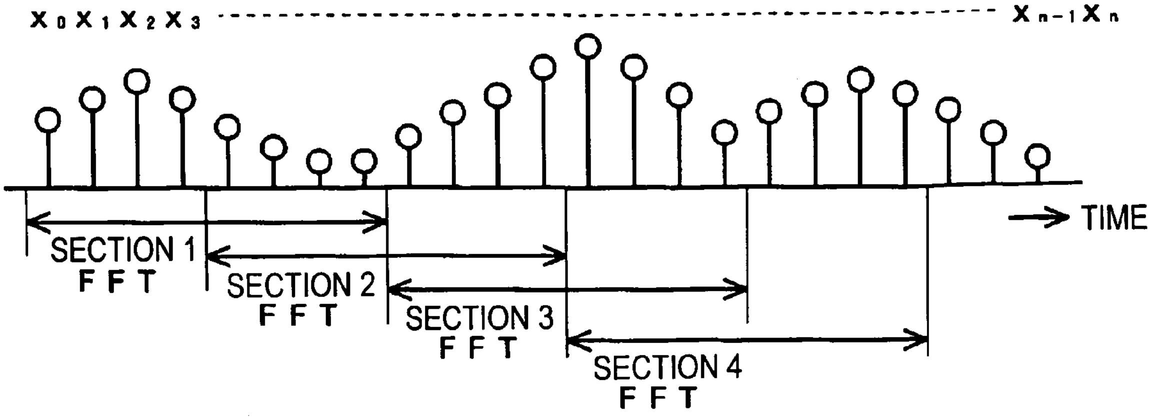
FIG. 14 is a block diagram of an audio signal processing apparatus according to a ninth embodiment of the present invention.

As illustrated in FIG. 14, according to a ninth embodiment, to obtain section data, unit sections of a section 1, a section 2, a section 3, a section 4 . . . each having the same length are generated. Section data of each of the sections is read out so that, for example, ½ of the length of adjacent unit sections overlaps each other. FIG. 14 illustrates sample data items x1, x2, x3 . . . xn of the digital audio signal.

Figure 15:
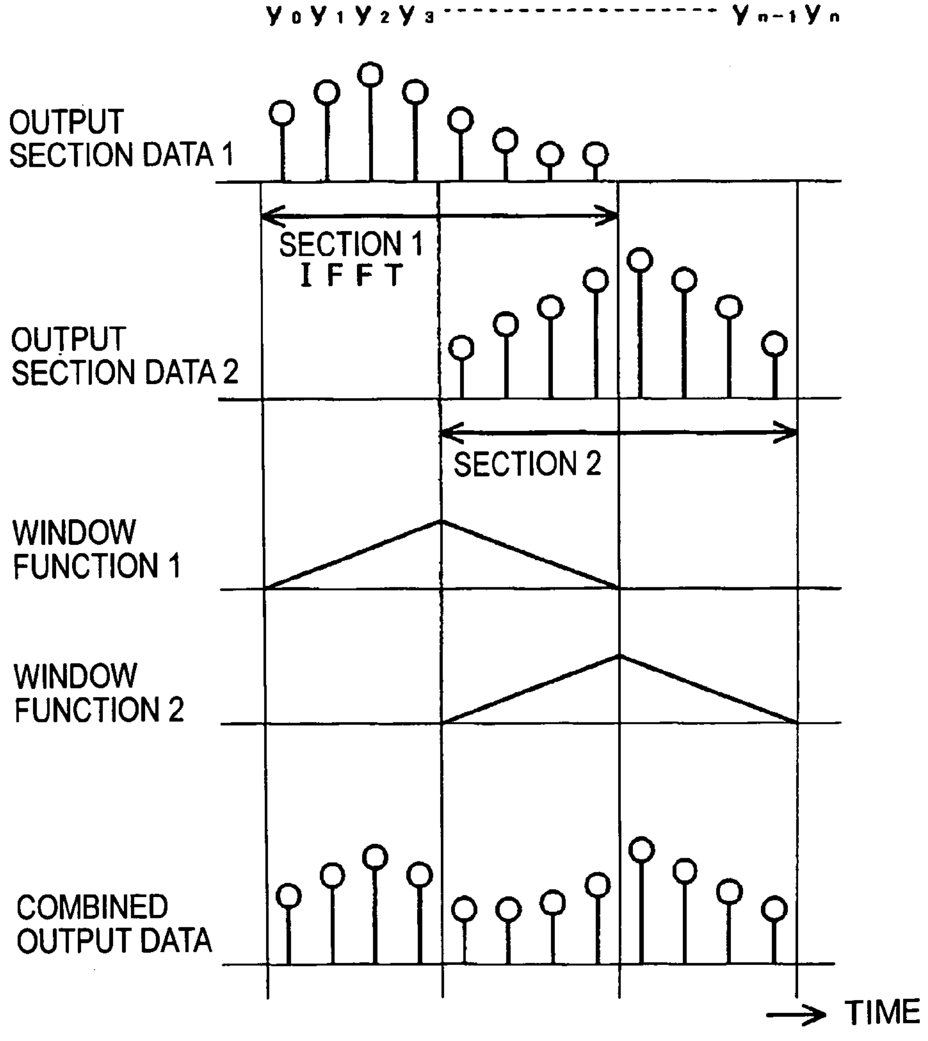
FIG. 15 illustrates the audio signal processing apparatus according to the ninth embodiment of the present invention.

By carrying out the above-described process, the time-sequential data having a sound source separated in the same manner as the above-described embodiments and being processed by inverse Fourier transfer (inverse FFT) will have overlapping portions as the output section data items 1 and 2, as illustrated in FIG. 15.

As illustrated in FIG. 15, according to the ninth embodiment, windowing based on window functions 1 and 2 having characteristics of a triangular window, as illustrated in FIG. 15, is carried out on the overlapping portions of output section data items, for example, the output section data items 1 and 2, adjacent to each other. Then, data of the same time in the overlapping portion in the output section data items 1 and 2 is added to obtain a combined output data, as illustrated in FIG. 15. In this way, an audio signal not including a predetermined sound source and having neither any discontinuous points in the waveform nor noise is obtained.

Figure 16:
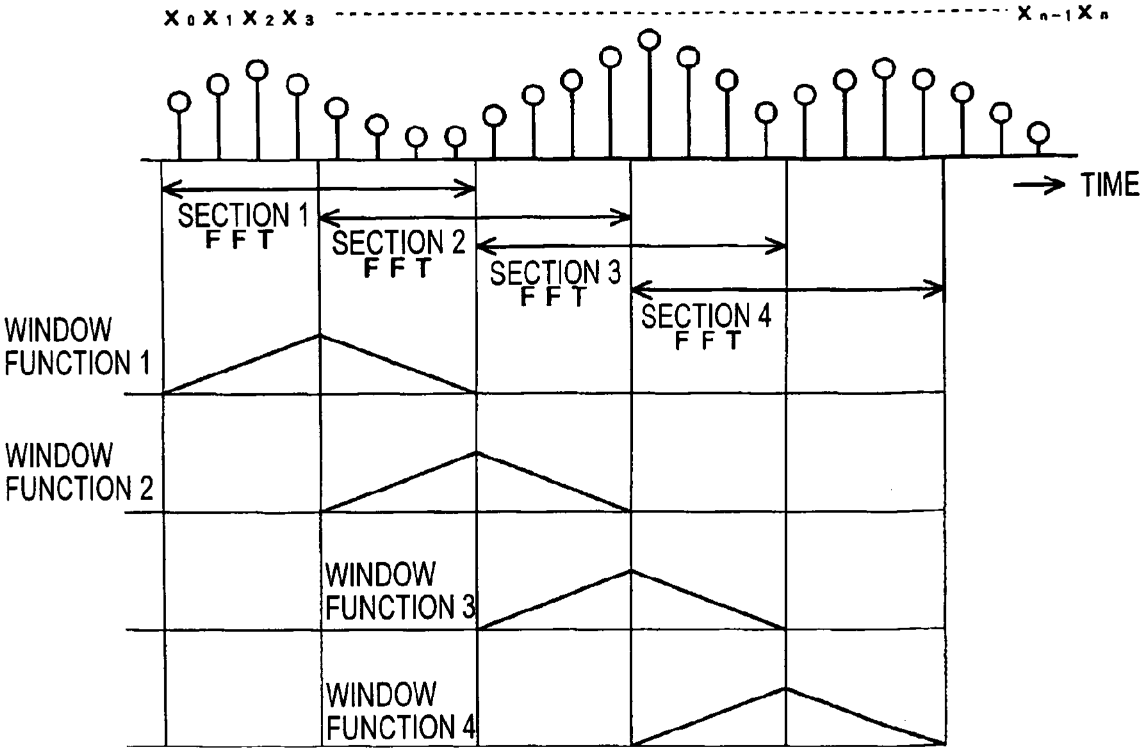
FIG. 16 is a block diagram of an audio signal processing apparatus according to a tenth embodiment of the present invention.

As illustrated in FIG. 16, according to a tenth embodiment, to obtain section data, predetermined sections, such as a section 1, a section 2, a section 3, and a section 4, overlapping each other are generated. At the same time, windowing based on triangular window functions 1, 2, 3, and 4 as illustrated in FIG. 16, is carried out on the section data items of these sections before carrying out fast Fourier transform (FFT).

Figure 17:
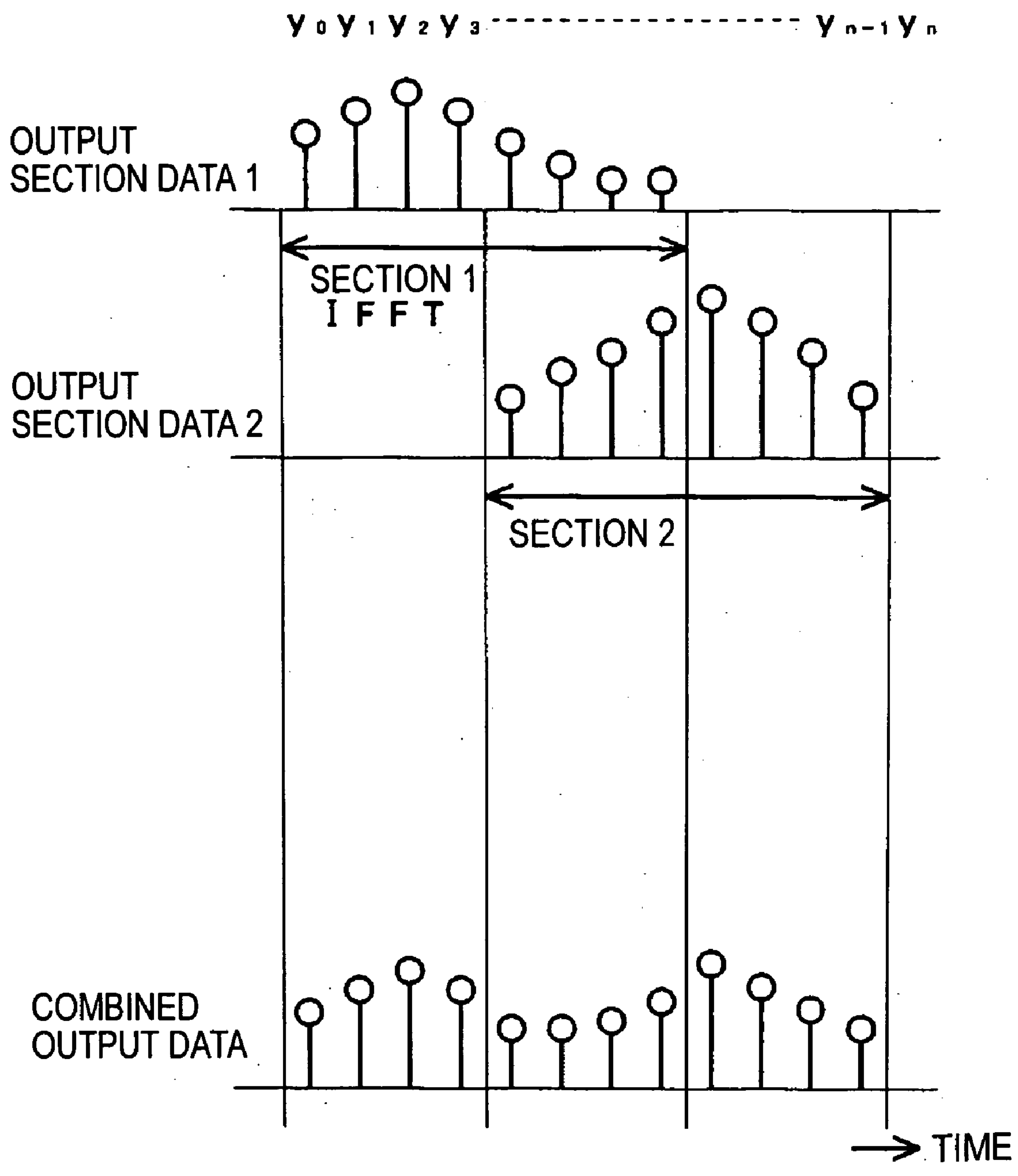
FIG. 17 illustrates the audio signal processing apparatus according to the tenth embodiment of the present invention.
Figure 18:
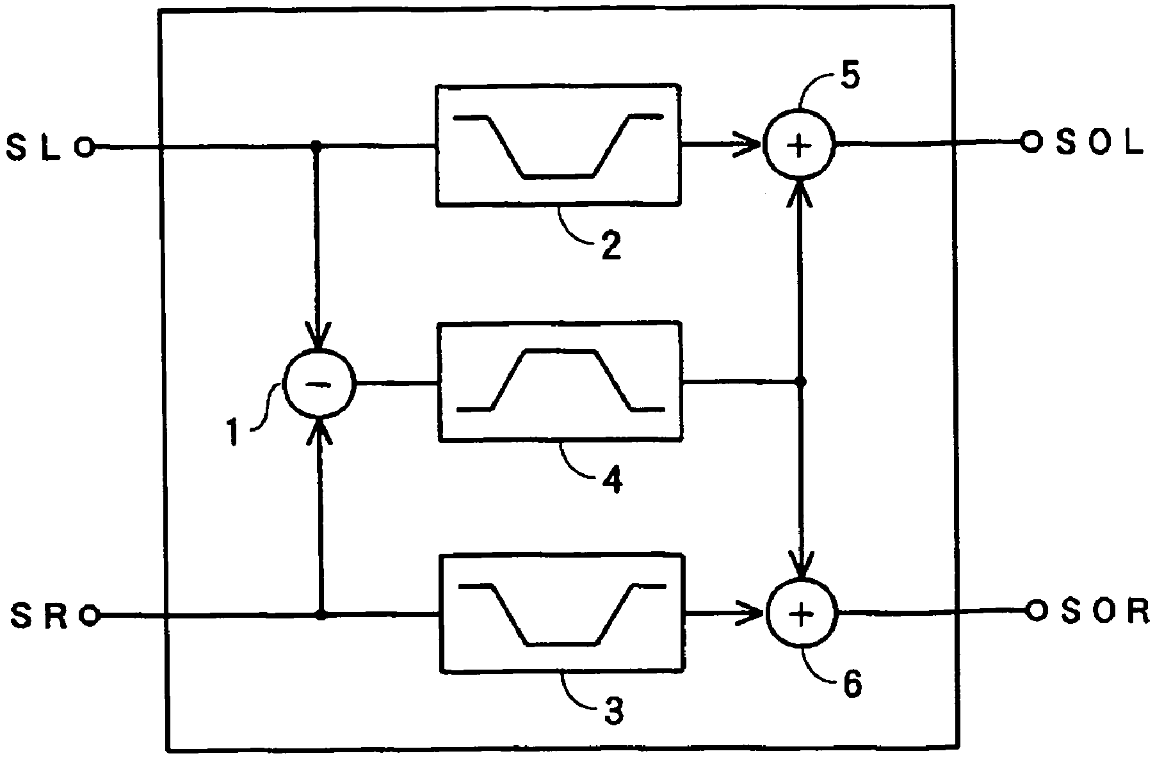
FIG. 18 is a block diagram illustrating a known method for removing singing voice.

As illustrated in FIG. 16, after carrying out windowing, fast Fourier transform (FFT) is carried out. Then, inverse fast Fourier transform (inverse FFT) is carried out on the signal having a predetermined sound source separated to obtain output section data items 1 and 2, as illustrated in FIG. 17. Since windowing has already been carried out on the overlapping portions of the output section data items, an audio signal not including a predetermined sound source and having neither any discontinuous points in the waveform nor noise can be obtained at an output unit by merely adding the overlapping sections of the section data items.

As the window function used in the windowing process described above, in addition to a triangular window, a Hanning window, a Hamming window, and a Blackman window may be used.

In the above described embodiment, time discrete signals transformed to obtain frequency domain signals and frequency spectral components of stereo channels are compared. Instead, in principle, a signal may be segmented by a plurality of band-pass filters in a time domain and the same process may be carried out on the frequency bands. However, it is easier to increase the frequency resolution and improve the quality of sound source separation by carrying out fast Fourier transform (FFT) as described above. Therefore, it is more practical to carrying out fast Fourier transform (FFT).

According to the above described embodiments, two-channel stereo signals are used as two-system audio signals. However, any two audio signals may be used so long as the audio signals of a sound source are distributed among the two systems at a predetermined level ratio or in a predetermined level difference. This is also the same for phase difference.

According to the above described embodiments, the level ratio of frequency spectral components of audio signals of two systems is determined and removal coefficient generating units and multiplication coefficient generating units use functions of level ratio/multiplication coefficient are used. However, instead, the level difference of frequency spectral components of audio signals of two systems is determined and removal coefficient generating units and multiplication coefficient generating units use functions of level difference/multiplication coefficient may be used.

A converting unit configured to convert time-sequential signals to frequency domain signals is not limited to a FFT processing unit and any unit may be used so long as the unit is capable of comparing the level and phase of frequency spectral components.

It should be understood by those skilled in the art that various modifications, combinations, sub-combinations and alterations may occur depending on design requirements and other factors insofar as they are within the scope of the appended claims or the equivalents thereof.

What is claimed is:

1. An audio signal processing apparatus comprising:

splitting means for splitting an audio signal of a first system and another audio signal of a second system into pluralities of frequency band components;

level comparing means for calculating a level ratio or a level difference between each of the frequency bands of the first system and each of the frequency bands of the second systems;

output control means for removing frequency band components whose level ratio or level difference calculated by the level comparing means is equal and substantially equal to a predetermined value from at least one of the first and second systems, and phase difference calculating means for calculating a phase difference between the frequency spectral components from the first system and the frequency spectral components from the second system, wherein the output control means controls the level of the frequency spectral components obtained from at least one of the first and second systems on the basis of the calculation result of the level comparing means and the phase difference calculated by the phase difference calculating means and removes the frequency spectral components whose phase difference is equal and substantially equal to a predetermined value from at least one of the frequency spectral components of the first system and frequency spectral components of second system.

2. An audio signal processing apparatus comprising:

first conversion means for converting time-sequential audio signals from a first system into frequency domain signals;

second conversion means for converting time-sequential audio signals from a second system into frequency domain signals;

level calculating means for calculating a level ratio or a level difference between frequency spectral components from the first conversion means and the frequency spectral components from the second conversion means, the frequency spectral components from the first conversion means and the frequency spectral components from the second conversion means corresponding to each other;

output control means for controlling the level of the frequency spectral components obtained from at least one of the first and second conversion means on the basis of the calculation result of the level calculating means and removing frequency spectral components whose level ratio or level difference calculated by the level comparing means is equal and substantially equal to a predetermined value from at least one of frequency spectral components of the first system and frequency spectral components of second system;

inverse conversion means for converting the frequency domain signals from the output control means into time-sequential signals; and phase difference calculating means for calculating a phase difference between the frequency spectral components from the first conversion means and the frequency spectral components from the second conversion means, the frequency spectral components from the first conversion means and the frequency spectral components from the second conversion means corresponding to each other, wherein the output control means controls the level of the frequency spectral components obtained from at least one of the first and second conversion means on the basis of the calculation result of the level calculating means and the phase difference calculated by the phase difference calculating means and removes the frequency spectral components whose phase difference is equal and substantially equal to a predetermined value from at least one of the frequency spectral components of the first system and frequency spectral components of second system.

3. The audio signal processing apparatus according to claim 2, wherein the output control means includes a multiplication coefficient generating unit for generating a multiplication coefficient that is set as a function of the level ratio or the level difference calculated at the level calculating means, and a multiplying unit for determining an output level of the frequency spectral components obtained from at least one of the first conversion means and the second conversion means by multiplying the multiplication coefficient generated at the multiplication coefficient generating unit and the frequency spectral components.

4. The audio signal processing apparatus according to claim 2, wherein the output control means includes a multiplication coefficient generating unit for generating a multiplication coefficient set as a function of the phase difference calculated at the phase difference calculating means, and a multiplying unit for determining an output level of frequency spectral components obtained from at least one of the first conversion means and the second conversion means by multiplying the multiplication coefficient generated at the multiplication coefficient generating unit and the frequency spectral components.

5. The audio signal processing apparatus according to claim 2, wherein the output control means includes a plurality of multiplication coefficient generating units for generating multiplication coefficients that are set as functions of the level ratio or level difference calculated at the level calculating means and a plurality of multiplying units for determining an output level of frequency spectral components obtained from at least one of the first conversion means and the second conversion means by multiplying the multiplication coefficients generated at the multiplication coefficient generating units and the frequency spectral components, and wherein the inverse conversion means includes a plurality of inverse conversion sections for converting the outputs from the plurality of multiplying units into time-sequential signals.

6. The audio signal processing apparatus according to claim 2, wherein the output control means includes a plurality of multiplication coefficient generating units for generating multiplication coefficients that are set as functions of the level ratio or level difference calculated at the level calculating means, a selecting unit for selecting one of the multiplication coefficients generated at the plurality of multiplication coefficient generating units, and a multiplying unit for determining an output level of frequency spectral components obtained from at least one of the first conversion means and the second conversion means by multiplying the multiplication coefficient selected at the selecting unit and the frequency spectral components.

7. The audio signal processing apparatus according to claim 2, further comprising:

sectioning means for generating section data items by sectioning time-sequential signals of first and second systems into predetermined sections, overlapping parts of adjacent section data items, and supplying the section data items to the first and second conversion means; and output means for windowing time-sequential signals output from the inverse conversion means corresponding to the section data items, adding each of the time-sequential signals corresponding to the same time, and outputting the added results.

8. The audio signal processing apparatus according to claim 2, further comprising:

sectioning means for generating section data items by sectioning time-sequential signals of first and second systems into predetermined sections, overlapping parts of adjacent section data items, windowing the section data items, and supplying the section data items to the first and second conversion means; and output means for adding each time-sequential signal from the inverse conversion means corresponding to the same time and outputting the added results.

9. An audio signal processing method comprising:

splitting an audio signal of a first system and another audio signal of a second system into pluralities of frequency band components;

calculating a level ratio or a level difference between each of the frequency bands of the first system and each of the frequency bands of the second systems; and removing frequency band components whose level ratio or level difference calculated in the calculating step is equal and substantially equal to a predetermined value from at least one of the first and second systems; and calculating a phase difference between frequency spectral components obtained in the splitting an audio signal, wherein the removing frequency band components includes removing the frequency spectral components whose phase difference is equal and substantially equal to a predetermined value from at least one of the first and second system by controlling the level of the frequency spectral components of the first and second systems obtained in the splitting an audio signal on the basis of the calculation result obtained in the calculating a level ratio and the phase difference calculated in the calculating the phase difference.

10. An audio signal processing method comprising:

obtaining frequency spectral components of first and second systems by converting time-sequential audio signals of the first and second systems into frequency domain signals;

calculating a level ratio or a level difference between the frequency spectral components of the first system and the frequency spectral components of the second system obtained in the obtaining step, the frequency spectral components of the first system and the frequency spectral components of the second system corresponding to each other;

controlling the level of at least one of the frequency spectral components of the first system and the frequency spectral components second system obtained in the obtaining step on the basis of the calculation result obtained in the calculating step and removing frequency spectral components whose level ratio or level difference calculated in the calculating step is equal and substantially equal to a predetermined value from at least one of the first and second systems;

converting the frequency domain signals obtained in the controlling step into time-sequential signals; and calculating the phase difference between frequency spectral components obtained in the obtaining frequency spectral components, the frequency spectral components of the first system and the frequency spectral components of the second system corresponding to each other, wherein the controlling the level includes removing the frequency spectral components whose phase difference is equal and substantially equal to a predetermined value from at least one of the first and second system by controlling the level of the frequency spectral components of the first and second systems obtained in the obtaining frequency spectral components on the basis of the calculation result obtained in the calculating the level ratio and the phase difference calculated in calculating the phase difference.

11. An audio signal processing apparatus comprising:

a splitting unit configured to split an audio signal of a first system and another audio signal of a second system into pluralities of frequency band components;

a level comparing unit configured to calculate a level ratio or a level difference between each of the frequency bands of the first system and each of the frequency bands of the second systems;

an output control unit configured to remove frequency band components whose level ratio or level difference calculated by the level comparing unit is equal and substantially equal to a predetermined value from at least one of the first and second systems; and a phase difference calculating unit configured to calculate a phase difference between the frequency spectral components from the first system and the frequency spectral components from the second system, wherein the output control unit controls the level of the frequency spectral components obtained from at least one of the first and second systems on the basis of the calculation result of the level comparing unit and the phase difference calculated by the phase difference calculating unit, and removes the frequency spectral components whose phase difference is equal and substantially equal to a predetermined value from at least one of the frequency spectral components of the first system and frequency spectral components of second system.

12. An audio signal processing apparatus comprising:

a first conversion unit configured to convert time-sequential audio signals from a first system into frequency domain signals;

a second conversion unit configured to convert time-sequential audio signals from a second system into frequency domain signals;

a level calculating unit configured to calculate a level ratio or a level difference between frequency spectral components from the first conversion unit and the frequency spectral components from the second conversion unit, the frequency spectral components from the first conversion unit and the frequency spectral components from the second conversion units corresponding to each other;

an output control unit configured to control the level of the frequency spectral components obtained from at least one of the first and second conversion units on the basis of the calculation result of the level calculating unit and removing frequency spectral components whose level ratio or level difference calculated by the level comparing unit is equal and substantially equal to a predetermined value from at least one of the first and second conversion units;

an inverse conversion unit configured to convert the frequency domain signals from the output control unit into time-sequential signals; and a phase difference calculating unit configured to calculate a phase difference between the frequency spectral components from the first conversion unit and the frequency spectral components from the second conversion unit, the frequency spectral components from the first conversion unit and the frequency spectral components from the second conversion unit corresponding to each other, wherein the output control unit controls the level of the frequency spectral components obtained from at least one of the first and second conversion units on the basis of the calculation result of the level calculating unit and the phase difference calculated by the phase difference calculating unit, and removes the frequency spectral components whose phase difference is equal and substantially equal to a predetermined value from at least one of the frequency spectral components of the first system and frequency spectral components of second system.

13. The audio signal processing apparatus according to claim 12, wherein the output control unit includes a multiplication coefficient generating unit configured to generate a multiplication coefficient that is set as a function of the level ratio or the level difference calculated at the level calculating unit; and a multiplying unit configured to determine an output level of the frequency spectral components obtained from at least one of the first conversion unit and the second conversion unit by multiplying the multiplication coefficient generated at the multiplication coefficient generating unit and the frequency spectral components.

14. The audio signal processing apparatus according to claim 12, wherein the output control unit includes a multiplication coefficient generating unit configured to generate a multiplication coefficient set as a function of the phase difference calculated at the phase difference calculating unit; and a multiplying unit configured to determine an output level of frequency spectral components obtained from at least one of the first conversion unit and the second conversion unit by multiplying the multiplication coefficient generated at the multiplication coefficient generating unit and the frequency spectral components.

15. The audio signal processing apparatus according to claim 12, wherein the output control unit includes a plurality of multiplication coefficient generating units configured to generate multiplication coefficients that are set as functions of the level ratio or level difference calculated at the level calculating unit; and a plurality of multiplying units configured to determine an output level of frequency spectral components obtained from at least one of the first conversion unit and the second conversion unit by multiplying the multiplication coefficients generated at the multiplication coefficient generating unit and the frequency spectral components, and the inverse conversion unit includes a plurality of inverse conversion sections configured to convert the outputs from the plurality of multiplying units into time-sequential signals.

16. The audio signal processing apparatus according to claim 12, wherein the output control unit includes a plurality of multiplication coefficient generating units configured to generate multiplication coefficients that are set as functions of the level ratio or level difference calculated at the level calculating unit;

a selecting unit configured to select one of the multiplication coefficients generated at the plurality of multiplication coefficient generating units; and a multiplying unit configured to determine an output level of frequency spectral components obtained from at least one of the first conversion unit and the second conversion unit by multiplying the multiplication coefficient selected at the selecting unit and the frequency spectral components.

17. The audio signal processing apparatus according to claim 12, further comprising:

a sectioning unit configured to generate section data items by sectioning time-sequential signals of first and second systems into predetermined sections, overlapping parts of adjacent section data items, and supplying the section data items to the first and second conversion units; and an output unit configured to window time-sequential signals output from the inverse conversion unit corresponding to the section data items, adding each of the time-sequential signals corresponding to the same time, and outputting the added results.

18. The audio signal processing apparatus according to claim 12, further comprising:

a sectioning unit configured to generate section data items by sectioning time-sequential signals of first and second systems into predetermined sections, overlapping parts of adjacent section data items, windowing the section data items, and supplying the section data items to the first and second conversion units; and an output unit configured to add each time-sequential signal from the inverse conversion unit corresponding to the same time and outputting the added results.

* * * * *